(12) United States Patent
Lochtefeld

(10) Patent No.: US 9,144,727 B2
(45) Date of Patent: Sep. 29, 2015

(54) METHOD AND APPARATUS FOR ADJUSTING AND STABILIZING A WAVE GENERATOR TRAVELING THROUGH A BODY OF WATER

(71) Applicant: Thomas J. Lochtefeld, La Jolla, CA (US)

(72) Inventor: Thomas J. Lochtefeld, La Jolla, CA (US)

( * ) Notice: Subject to any disclaimer, the term of this patent is extended or adjusted under 35 U.S.C. 154(b) by 150 days.

(21) Appl. No.: 13/757,130

(22) Filed: Feb. 1, 2013

(65) Prior Publication Data

US 2013/0199433 A1 Aug. 8, 2013

Related U.S. Application Data

(60) Provisional application No. 61/594,447, filed on Feb. 3, 2012.

(51) Int. Cl.

| | |
|---|---|
| *B63B 21/56* | (2006.01) |
| *A63B 69/00* | (2006.01) |
| *B63B 35/85* | (2006.01) |
| *B66D 1/20* | (2006.01) |
| B63B 1/16 | (2006.01) |
| B63B 21/16 | (2006.01) |
| B63B 43/06 | (2006.01) |

(52) U.S. Cl.
CPC .............. *A63B 69/0093* (2013.01); *B63B 21/56* (2013.01); *B63B 35/85* (2013.01); *B66D 1/20* (2013.01); *B63B 1/16* (2013.01); *B63B 21/16* (2013.01); *B63B 43/06* (2013.01); *B63B 2035/855* (2013.01); *Y02E 10/38* (2013.01)

(58) Field of Classification Search
CPC ........ B63B 21/56; B63B 21/66; B63B 35/85; B63G 8/42; E04H 4/0006; A63B 69/0093; A63G 31/007

USPC .................................. 114/242, 253; 405/79
See application file for complete search history.

(56) References Cited

U.S. PATENT DOCUMENTS

| 586,983 A | 7/1897 | Wharton |
|---|---|---|
| 2,064,035 A | 12/1936 | Rynearson |
| 3,005,207 A | 10/1961 | Matrai |

(Continued)

FOREIGN PATENT DOCUMENTS

| FR | 1.019.527 | 1/1953 |
|---|---|---|
| JP | 52-41392 | 3/1977 |
| JP | 54-118630 | 9/1979 |

*Primary Examiner* — Lars A Olson
(74) *Attorney, Agent, or Firm* — J. John Shimazaki

(57) ABSTRACT

The invention relates to a positively buoyant wave generator adapted to travel through a body of water, wherein specific features are incorporated into the wave generator to help create and off-set various hydrodynamic forces that can act on the wave generator as it travels through the water. Rather than eliminating these hydrodynamic forces, the invention seeks to create and counter these forces, which has been found to help keep the wave generator in substantial equilibrium. For example, a connecting member can be extended forward and below the wave generator's center of buoyancy, such that as the wave generator is pulled, it creates an upward force that helps to counter a downward force acting on the front end of the wave generator as water is lifted up. Various internal moments can also be created and off-set by adjusting the center of gravity and/or center of buoyancy and using these forces to help keep the wave generator in substantial equilibrium. Different configurations, surfaces and curvatures can also be used to help create additional counteracting and stabilizing forces and moments.

20 Claims, 13 Drawing Sheets

(56) References Cited

U.S. PATENT DOCUMENTS

| | | |
|---|---|---|
| 3,473,334 A | 10/1969 | Dexter |
| 3,557,559 A | 1/1971 | Barr |
| 3,562,823 A | 2/1971 | Koster |
| 3,789,612 A | 2/1974 | Richard et al. |
| 3,802,697 A | 4/1974 | LeMehaute |
| 3,851,476 A | 12/1974 | Edwards |
| 3,913,332 A | 10/1975 | Forsman |
| 4,522,535 A | 6/1985 | Bastenhof |
| 4,662,781 A | 5/1987 | Tinkler |
| 4,792,260 A | 12/1988 | Sauerbier |
| 4,954,014 A | 9/1990 | Sauerbier et al. |
| 5,000,110 A | 3/1991 | Moore |
| 5,171,101 A | 12/1992 | Sauerbier et al. |
| 5,342,145 A | 8/1994 | Cohen |
| 5,664,910 A * | 9/1997 | Lochtefeld et al. ............ 405/79 |
| 5,766,082 A | 6/1998 | Lochtefeld et al. |
| 5,860,766 A | 1/1999 | Lochtefeld et al. |
| 5,911,190 A | 6/1999 | Lochtefeld et al. |
| 6,047,657 A * | 4/2000 | Cox ............................ 114/242 |
| 6,105,527 A | 8/2000 | Lochtefeld et al. |
| 6,336,771 B1 | 1/2002 | Hill |
| 6,460,201 B1 | 10/2002 | Lochtefeld |
| 6,928,670 B2 | 8/2005 | Lochtefeld et al. |
| 2010/0017951 A1 | 1/2010 | Sagastume |

* cited by examiner

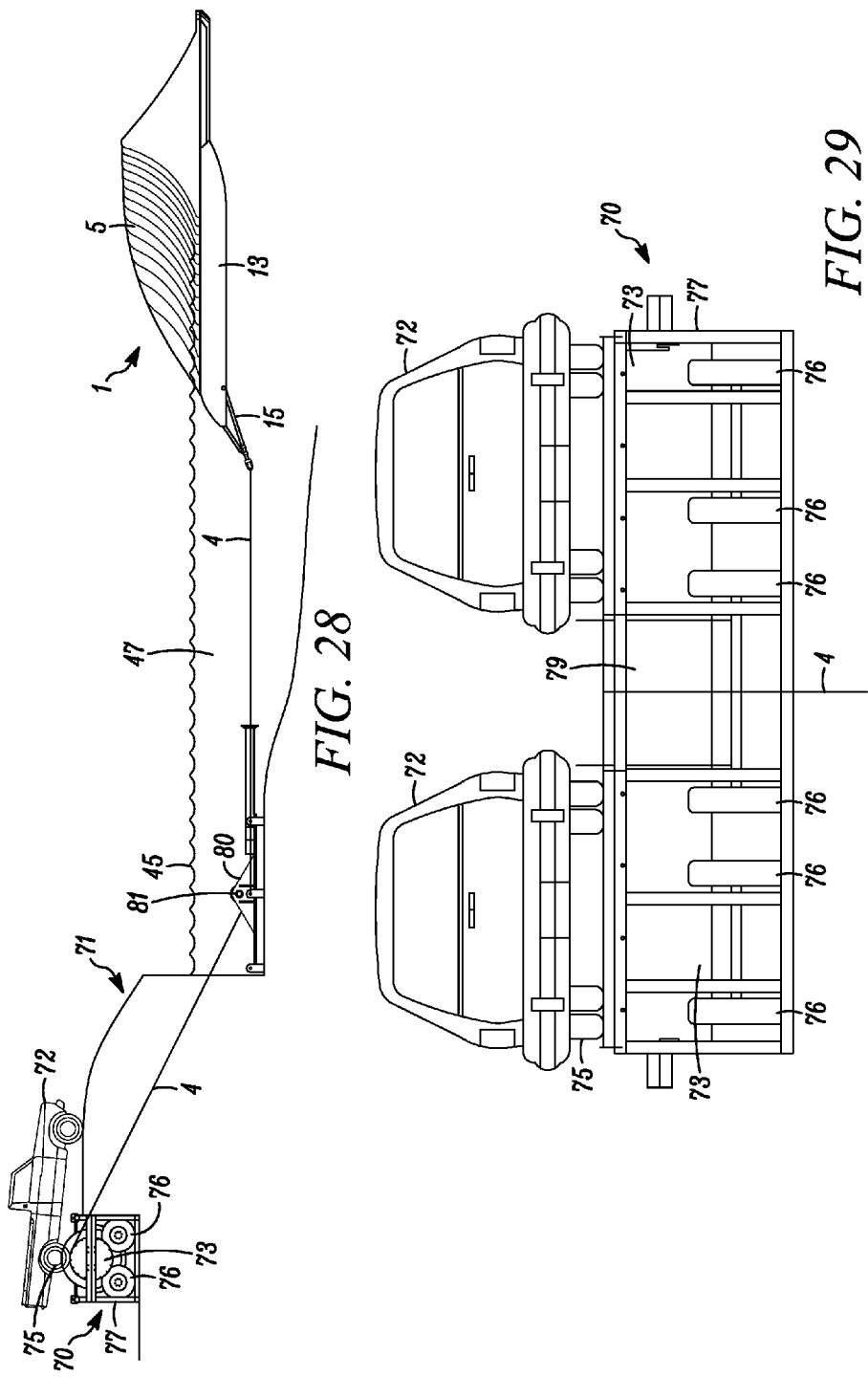

METHOD AND APPARATUS FOR ADJUSTING AND STABILIZING A WAVE GENERATOR TRAVELING THROUGH A BODY OF WATER

RELATED APPLICATION

This application claims the benefit of the filing date of U.S. Provisional Application Ser. No. 61/594,447, filed Feb. 3, 2012, entitled "METHOD AND APPARATUS TO ADJUST AND STABILIZE A WAVE GENERATOR TRAVELING THROUGH A BODY OF WATER."

FIELD OF THE INVENTION

The present invention relates to a method and apparatus for producing surfable waves in a body of water, and in particular, to a method and apparatus for adjusting and stabilizing a positively buoyant wave generator as it travels through the body of water.

BACKGROUND OF THE INVENTION

Surfing, as a sport, has become extremely popular and has attracted enthusiasts from all over the world. Particularly prized by expert surfers are the waves classified as plunging, "barreling", "tubing" or "the pipeline," which are waves that move with sufficient velocity and height so that, when they encounter an upwardly sloped bottom of a certain configuration, they curl forward over the advancing base of the wave to form a tunnel or barrel shape, inside the mouth of which an expert surfer can maneuver and move laterally across, while seeking to keep pace with the forward movement of the developing wave, without being caught in the collapsing portion thereof.

The formation of ideal waves under natural conditions requires a comparatively rare combination of factors, including wind of a certain constancy of velocity and direction, and waves of a certain velocity, direction and height, approaching a shoreline having a certain bottom slope and configuration, etc. The problem, however, is that very few locations in the world have such favorable conditions and characteristics. Even areas where favorable land and water conditions exist, the most favorable surfing conditions typically occur only during certain times of the year, and only during ideal weather conditions, and therefore, surfing has eluded all but the most dedicated enthusiasts who can afford to travel thousands of miles to reach destinations where ideal surfing conditions exist, at times when ideal weather conditions also exist.

One partial solution was developed by the applicants several years ago in the form of a stationary sheet wave water ride known as the Flow-Rider® and FlowBarrel®. Flow Riders are essentially stationary sheet wave water rides comprising a stationary ride surface that simulates the shape of a wave, and upon which a sheet flow of water under pressure can be propelled, to form a wave shape similar to those that exist in nature, such as a tunnel wave. These water rides have become popular in recent years and have been installed at many locations throughout the world, including at various water theme parks, on cruise ships, etc., and enable even the most inexperienced surfer an opportunity to ride a virtual perfect wave, so that they no longer have to travel thousands of miles to experience the thrill of surfing.

Notwithstanding the advantages of these wave generating devices, a potential drawback is that these water rides don't necessarily create actual waves upon which real surfboards can be used. Rather, they create a wave shape created by a supercritical stream of water flowing over a resilient ride surface shaped to mimic a wave on which a special board can be used that takes advantage of ground effects resulting from the proximate ride surface. Due to these ground effects, a FlowRider's flowboard is contrasted to a normal surfboard by its significantly smaller size, e.g., in one example the board is 1 ft. (30 cm) wide by 39 inches (1 meter) long by ⅝ inches (1.5 cm) thick, with little or no fin extending therefrom. As an additional point of differentiation, the FlowRider style wave is stationary, as opposed to the progressive motion of an ocean wave that normally breaks obliquely from point A to point B along a beach. While riding on "waves" created by the Flow-Rider is a thrilling and exhilarating experience, the skills that are necessary to become proficient at "flow riding" are not identical to those needed to become proficient at real surfing (using real finned surf boards on ocean waves that break in a progressive fashion from point A to point B).

In the past, various attempts have been made to create wave pools, which are artificial bodies of water in which waves are created and travel across the pool and then break progressively along a shoaling beach. With a wave generator positioned at one end, the generator typically creates a wave that travels from that end of the pool to the opposite end where a sloped beach is located. One of the problems with these types of wave pools is that one needs a specific purpose built concrete pool, which is quite costly to build.

In U.S. Pat. No. 5,664,910, Applicants disclosed a Boat Activated Wave Generator which was an attempt to pull a buoyant wave generator across a body of water such that, as it moved forward, it lifted up a sheet flow of water onto a curved wave generator hull to create curling wave shapes across the generator. The goal of the invention was to enable the wave generator to travel across or through the water, at a relatively constant level, such that, as it travelled forward, the leading edge could cut through the water at just the right depth, wherein a sheet flow of water, with a substantially constant thickness, could then be pared and lifted up onto the curved hull surface, such that a substantially consistent curling wave shape could then be created upon which surfing maneuvers can be performed. That patent disclosed various factors potentially affecting the depth of the leading edge, and therefore, the quality of the wave shapes that were created, including the buoyancy and weight of the generator itself.

While careful thought went into designing certain aspects of the previous wave generator design and various factors were believed to be significant in producing the desired results, Applicants have since discovered certain improvements that can be used to enhance the wave generator's ability to create consistently high quality surfable waves. One drawback to the previous embodiments described above, i.e., wave generators that float in a relatively deep body of water, included the difficulty of keeping the generator's leading edge at a substantially constant depth in the water, as it travelled across or through the water surface, to create smooth and stable wave shapes that are suitable for surfing. For example, without the use of a front disc or torpedo shaped stabilizing device, which that patent specified using in certain embodiments, the generator had a tendency to dive too abruptly, or plane too far up, and in either case, the depth at which the leading edge travelled across or through the water surface became difficult to control, thereby making it difficult to keep the generator in substantial equilibrium to produce consistently smooth and stable wave shapes. At the same time, using the disc or torpedo shaped stabilizing device ended up creating undue turbulence, wherein the choppiness of the water encountered by the wave generator tended to negatively impact the shape and stability of the wave shapes created thereby.

For these reasons, past attempts have failed to produce consistently smooth and stable wave shapes suitable for surfing, and lacked the means to account for the various hydrodynamic forces that are applied against the generator as it travelled through the water. Thus, an improved method and apparatus for producing wave shapes using a positively buoyant wave generator that travels across or through the water surface in a relatively deep body of water is needed, but unlike previous designs, what is needed is an improvement that helps keep the generator in substantial hydrodynamic equilibrium, and the leading edge at a substantially constant depth in the water, to produce consistently smooth and stable wave shapes on which a surfer using a standard surf board with a fin extending therefrom can ride.

SUMMARY OF THE INVENTION

The present invention relates to an improved method and apparatus for creating surfable waves in a body of water, using a positively buoyant wave generator capable of being pulled across and/or through the body of water, wherein the generator has specific curved flow-forming surfaces on top, and a leading edge that pares and lifts up a slice, slab or sheet flow of water having a predetermined thickness, to create upward and laterally flowing wave shapes on the flow-forming surface, wherein specific design features are provided to enable the generator to remain in substantial hydrodynamic equilibrium, as it travels through the water, to keep the leading edge at a substantially constant depth in the water, such that consistently smooth and stable curling wave shapes on which surfing maneuvers can be performed can be created thereby.

Generally speaking, the wave generator of the present invention is preferably substantially in the shape of a triangular wing, with a V shaped forward vertex extending section, along with substantially symmetrically shaped wave generator hulls, with curved flow-forming surfaces thereon, extending upward and rearward on either side, wherein the generator preferably floats and can be pulled substantially across or through the water to create wave shapes on the water surface using a cable or rope and a driving mechanism, etc.

Preferably, the upper flow-forming surface comprises horizontal and vertical curvatures, such that, during operation, as the generator is pulled across or through the water surface, and lifts up a slice, slab or sheet flow of water, a theoretical infinitesimal body of water, moving along the face of the hulls, will encounter a force, which is primarily vertical and forward, as this portion of water travels along the curved face thereof. This force, or pressure field, preferably helps to accelerate the water, forcing it upward and forward, and above the surrounding body of water, so that the force of gravity can overcome its upward and forward momentum, causing it to fall back down in a curving arc, to the base of the advancing wave. If the forward and upward momentum is sufficient, its path will form a substantial loop, wherein, as the water stacks on top of itself, it will eventually curl forward and back down again, wherein a curling wave shape can be created. The sheet flow of water pared and lifted up by the leading edge will flow upward, over and across the generator hulls, to form a tunnel wave shape, similar to those that exist in nature, at the mouth of which a rider can perform surfing maneuvers thereon.

Because the generator hulls are preferably symmetrically configured on either side, the generator tends to divide the water that it travels through into two sections, wherein the generator hulls preferably create two substantially identical but inversely shaped wave formations which extend in opposite directions on either side thereof (i.e., a right breaking wave, and a left breaking wave). Due to there being two substantially identically shaped generator hulls extending in opposite directions the water is preferably pushed upward but laterally outward in different directions, thereby creating two substantially identical but inversed wave shapes flowing in opposite directions, upon which two different surfers can ride at the same time, namely one surfer on the right break, and another surfer on the left break.

One of the advantages provided by the present invention includes producing specific forces that can act on the wave generator, which can off-set each other, and be used to keep the generator in substantial hydrodynamic equilibrium, by keeping the leading edge at a substantially constant depth in the water, which can help produce consistently smooth and stable wave shapes suitable for surfing. The present invention preferably takes into account and produces various hydrodynamic forces and moments that can be counteracted and off-set, to keep the generator in substantial equilibrium, wherein these forces can then be used to help, rather than hurt, the generator's ability to remain at a substantially constant depth in the water.

The following are some of the counteracting forces and moments that can be created and used to help keep the wave generator in substantial equilibrium:

First, it is initially helpful for the weight and buoyancy of the generator to be designed, based on the weight, shape and mass distribution of the generator itself, etc., to keep the leading edge at a substantially constant depth in the water. This normally takes into account the downward forces created by the weight of the generator, on one hand, and the upward forces created by the buoyancy of the generator, on the other hand. The off-setting effect of these static forces can keep the generator in static equilibrium, such as when the center of gravity and center of buoyancy are aligned, wherein the generator can remain relatively stable, i.e., no static rotational force will be applied.

At the same time, the present invention preferably takes into account the possibility that it may be desirable in some cases to have the center of gravity and center of buoyancy not line up, such that a predetermined amount of internal moment force is created, which, as will be discussed, can be used to off-set other forces, such as various hydrodynamic forces, to help keep the generator in substantial equilibrium. That is, creating an internal moment force within the generator can help to counter other forces that are applied, wherein the existence of these counteracting forces can help the generator's ability to remain in substantial equilibrium.

Another feature that can be used to help keep the generator in substantial equilibrium is the use of weight ballasts that can be located in predetermined locations throughout the generator to adjust and distribute the weight thereof, wherein these ballasts can be used to adjust not only the generator's center of gravity but center of buoyancy as well. For example, two ballasts can be provided near the front, and two ballasts can be provided near the aft region of the generator, wherein each ballast can be filled with a predetermined amount of water (or other weighted substance, such as sand, etc.) to adjust the distribution of weight thereof. The number and location of these ballasts can be adjusted to suit the needs of a particular application, wherein the goal is to use them to modify the generator's center of gravity and center of buoyancy as needed. These ballasts can also be used to adjust the generator's overall weight and buoyancy.

The above factors are pertinent to maintaining the generator in static equilibrium, but at the same time, it has been found that a number of hydrodynamic forces will also act upon the generator as it travels through the water, which will have to be accounted for, and off-set, wherein, it will become necessary to create various counteracting forces, which can off-set each other, to keep the generator in substantial equilibrium. The challenge has been to account for not only the static forces that exist, but also the dynamic forces that are created and applied as the generator is pulled through the water, wherein, by specifically accounting for these counteracting forces, and off-setting them, the present invention can keep the generator in substantial equilibrium, to create consistent and stable wave shapes.

The generator is preferably positively buoyant, which means that when it is in a static mode, it preferably sits up along the water's surface, and then, when the drive mechanism is activated and forward motion commences, the generator can begin to sink lower into the water (relative to the static water surface) due to hydrodynamic forces acting on the generator, whereupon a gravitational (weight) induced downward force can interact fore and aft relative to the vessel's center of buoyancy, in conjunction with the upward hydrodynamic planing forces that are applied due to the generator's forward motion. The main hydrodynamic force that must be accounted for and counteracted is the downward force applied to the generator's front end by the weight and force of water being pared and lifted up by the leading edge onto the generator hulls, which, by virtue of lifting water up, creates a reciprocal downward force on the forward end thereof. The amount and nature of this downward force can be a function of the depth at which the leading edge travels, which determines the thickness and weight of the slice, slab or sheet flow of water flowing onto the generator, but it is also a function of the speed at which the generator travels through the water, and the size, shape and curvature of the flow-forming surfaces, which can affect the dynamic flow of water onto and across the generator. This downward force normally creates a "positive" moment on the generator's front end, which, if unaccounted for, and not countered, can cause the generator to become destabilized as it travels through the water. This positive moment can be counteracted in part by the upward planing force acting on the bottom of the wave generator as it travels through the water, which creates a negative moment, but additional stabilizing and counteracting forces were found to be necessary or helpful in keeping the generator in substantial equilibrium.

One preferred feature of the present invention that helps to counteract these forces comprises the location and position of a forward extending tow connector that preferably extends substantially down and forward from the front end of the generator, on which the cable that pulls the generator through the water can be secured. The tow connector is preferably a rod or other member pivotally connected to the front end, so it can pivot from an upper/forward position, to a substantially vertical lower position, wherein a stop can be provided to prevent the connector from pivoting too far forward or too far backward.

One advantage of this tow connector is that it preferably helps to keep the generator's front end from dipping down too far by virtue of the location of the tow point (the location where the cable is secured to the tow connector), wherein the tow point is preferably located below the generator's lateral or longitudinal center of buoyancy. That is, when the cable pulls on the generator, and the cable applies a longitudinal force against the tow point, the cable preferably creates a "negative" moment about the transverse axis, which in turn, creates an upward force against the generator's front end, wherein, this upward force can then be used to counteract the weight and downward force of water flowing onto the generator (which otherwise creates a "positive" moment, as discussed), wherein the application of these counteracting forces can help to keep the generator in substantial equilibrium.

Another feature of the present invention that can be used to counter the forces is an optional downward facing stepped area on the bottom aft end of the generator, which preferably extends down from the bottom surface thereof, wherein the stepped area preferably has a forward facing downward inclined surface that extends down at an angle relative to the bottom surface, which can act upon the water flowing underneath it, to create an upward lift against the aft end, which in turn, creates a downward force on the front end, which in turn, creates a positive moment which can be helpful in counteracting the upward force or "negative" moment created as the cable pulls the generator through the water.

Another set of forces that should be taken into account and balanced occurs as the generator moves forward through the water. Due to this forward motion, water typically climbs up onto the flow-forming surfaces, which normally extend above and behind the generator's center of buoyancy. Then, as water continues to climb up the front of the device, the weight of the water exerts a downward force, as well as a change in momentum and resultant acceleration of water in an upward direction, causing additional downward forces to occur. As the water flows in an aft direction upon the generator and passes the generator's center of buoyancy, this force transitions to create an additional negative force on the generator's aft end, which in turn, creates an additional negative moment about the transverse axis, further lifting the forward end. As proven in testing, the architecture of this overall design can be tuned, wherein the downward forces of water flowing onto the forward sections of the generator can be off-set by the structure and design of the upward lifting characteristics of the aft section of the generator. This counter balancing of forces helps to keep the generator in substantial equilibrium.

Another aspect of the invention is that these design parameters are preferably taken into account with the generator travelling at preferred speeds, which, in the preferred embodiment, is the speed at which a surfable wave normally travels through the ocean, i.e., a speed of 20 to 23 feet (6 to 7 meters) per second, although speeds ranging from 10 to 46 feet (3 to 14 meters) per second are contemplated by the present invention. Note that these are just some of the ways in which the present invention can create and use counteracting forces to help keep the generator in substantial equilibrium—there are others that can also be used and taken into account, as will be discussed.

Another preferred aspect of the invention that helps to keep the generator in substantial equilibrium relates to the orientation of the cable that pulls the generator through the water, wherein, in the preferred embodiment, the cable is extended underwater and substantially horizontally through the water. This orientation is achieved by a pulley that can be located in the body of water—preferably at the same level as the tow point—despite having a driving mechanism located at a higher elevation, such as on shore, which can help keep the cable at the proper level.

Also, to create additional counteracting forces that can further help to keep the generator in equilibrium, the generator can be designed so that the center of gravity and center of buoyancy, as discussed above, are off-set, such that the application of these forces can create an internal moment that will tend to cause the generator to rotate in one direction or the other, depending on the desired design. For example, by locating the center of gravity behind the center of buoyancy, and having these centerlines not line up, an internal "negative" moment force can be created, which in turn, can create an upward force on the generator's front end, which in turn, can off-set the downward force created by the weight and force of water flowing on the generator (which creates a "positive" moment). And, by moving the center of gravity relative to the center of buoyancy, the appropriate amount of rotational force can be created, to oppose the appropriate hydrodynamic forces acting on the generator. The extent of these forces can be adjusted, for example, by adjusting the size, location and weighting of the ballasts, as well as the overall shape, size and weight of the generator itself.

Generally speaking, it has been found that rather than avoiding the creation of the above described static and hydrodynamic forces, it is actually desirable to create these forces so that they can counteract each other, and thus, the above features can be helpful in producing consistently smooth and stable wave shapes that are suitable for surfing as the generator travels through the water. Preferably, the above features are used to deliberately create static and dynamic forces and moments acting on the generator, which in turn, can keep the generator in substantial equilibrium. While only taking into account the static forces, such as weight and buoyancy, can keep the depth of the leading edge constant when the generator is at rest, various hydrodynamic forces must also be taken into account, including the forces that can cause the generator to dip down, or rise up, as the generator is pulled through the water, wherein these forces can, without being accounted for, prevent the generator from creating high quality waves.

One factor that has caused trouble in the past has been the inability to control the depth at which the leading edge travels through the water, which can make it difficult to control the thickness of the sheet flow of water flowing onto the generator, which in turn, can make it more difficult to control the downward forces acting on the front end. Thus, preferably, a specific feature of the present invention that helps keep the depth at which the leading edge of the generator travels through the water substantially constant comprises creating and adapting these forces such that they off-set each other, wherein the combination of all or most of these forces will help, rather than hurt, the generator's ability to remain in substantial equilibrium.

Preferably, the bottom surface of the generator is generally substantially flat and horizontal to reduce drag and friction, although it can, in addition to the inclined surface mentioned above, consist of a relatively narrow keel extending down in the center, to help keep the generator travelling in a straight line and relatively smooth and stable as it passes through the water. The keel acts much like a keel of a boat, wherein different size keels having different shapes and sizes are contemplated. The angle of the generator's front leading edge relative to a centerline can also range from about 30 to 70 degrees, with the preferred angle being about 40 to 50 degrees, although preferably, the waves they create will have a peel angle slightly higher.

Preferably, the aft end of the generator has a U shaped profile, or it can be straight across, or somewhere in between, etc. In this respect, the U shaped profile provides several advantages. First, the total surface area of the bottom surface can be reduced, which can help reduce friction and drag as the generator is pulled through the water. Friction not only affects the performance of the generator, but also increases the energy and cost needed to drive the generator through the water. Second, by creating a U shaped profile in the center of the generator, the hydrodynamic forces acting on the generator can be centralized, which is accomplished by allowing water displaced by the generator as it travels through the water to rise up through the center, thereby counteracting the tendency for the generator to shift from side to side, wherein the stability of the generator can be enhanced thereby. Third, by effectively cutting out a U shaped section along the aft end, the overall cost and weight of the generator can be reduced, i.e., this reduces the amount of material needed to make the generator. Fourth, by adjusting the cut-out size of the U-shaped section, one can adjust the planing characteristics of the generator, i.e., one can adjust the amount of lift on the aft section of the generator hull.

Preferably, the cable that pulls the generator through the water is driven by a driving mechanism located on the shoreline which in the preferred embodiment comprises one or more trucks or vehicles with sufficient horsepower to drive a drum wheel that pulls the cable and generator across or through the body of water. Preferably, at least two trucks with sufficient horsepower are positioned side by side facing the body of water, wherein the rear wheels/tires are preferably adapted to engage the drum wheel to cause it to rotate, wherein rotating the drum wheel will cause the cable and generator to be pulled through the water. A similar driving mechanism is preferably provided on the opposite end of the body of water to pull the generator in the opposite direction.

Preferably, the pulley system that helps to maintain the cable substantially horizontally in the water is located in the water, on or near the shoreline, at an elevation that substantially matches the tow point of the tow connector, to help keep the generator travelling at a substantially constant depth in the water. The pulley system preferably comprises a pulley that rotates about an axis, wherein the cable is passed underneath, to maintain the cable at the predetermined elevation, and by allowing the pulley to rotate, and keeping it secured relative to the ground, the tendency for the cable to pull up on the wave generator can be reduced.

Another feature of the present invention relates to its ability to easily pivot at the end of a run and then return across the body of water in the opposite direction. This is accomplished in part by having driving mechanisms that drive the cable back and forth in opposite directions. But to facilitate an easy turn-around of the generator at the end of each run, the tow connector is preferably designed to pivot forward and backward, and preferably has a swivel joint. This way, as the generator is pulled across the water, and the cable slows down, the tow connector will pivot down, such as by gravity, to a substantially vertical position, and with the help of the swivel joint, the generator's forward momentum can cause the generator to rotate about the tow connector, until it ends up facing the opposite direction. In this respect, the cable can be stopped or pulled slightly in the opposite direction to cause the generator to finish rotating, and the swivel joint enables the generator to rotate without twisting the cable. Then, as the cable begins to pull the generator in the opposite direction, the tow connector will pivot forward again, and the cable can then be used to pull the generator through the water in the opposite direction. The system preferably enables the generator to be pulled in one direction, and then rotated at the end of a run, and then pulled back across the water in the opposite direction, wherein the cable is preferably adapted to pull the generator in both directions.

BRIEF DESCRIPTION OF THE DRAWINGS

FIGS. 15 and 16 show the wave generator floating on the water surface at rest with the leading edge submerged and extended below the water level;

FIGS. 17 and 18 show the wave generator during acceleration, wherein these figures show the wave generator moving slowly through the water, as water begins to flow over and onto the wave generator hull, wherein the weight and force of the water flowing thereon exerts a downward force, causing the generator to drop further below the water surface;

FIGS. 19 and 20 show the wave generator during operation travelling through the water, wherein these figures show the wave generator moving faster, almost or at full speed, with water flowing onto, over and laterally across the wave generator hull, wherein the generator has risen back up, and is forming curling wave shapes on which surfers can surf thereon;

FIG. 24 shows the wave generator travelling through the water in a direction from right to left, wherein the generator has a pivoting tow connector extending down and forward in the front, wherein the generator is being pulled by a cable secured to the tow connector;

FIG. 25 shows the generator with a pivoting connector that has a lower swivel joint, wherein the generator has stopped at the end of a run and the tow connector has pivoted down;

FIG. 26 shows the wave generator at the end of a run rotating around the tow connector, which can be accomplished by the cable being stopped or lightly pulled in the opposite direction;

FIG. 27 shows the wave generator facing the opposite direction and being pulled by the cable in the opposite direction from left to right;

FIG. 28 shows a driving mechanism for pulling the cable through the water powered by one or more trucks located on the shoreline, wherein the truck's wheels frictionally engage a drive drum, and rotating the drive drum causes the cable and therefore the generator to be pulled through the water, wherein an additional pulley system near the water's edge is provided to maintain the cable below the surface of the body of water and substantially horizontally oriented at or near the level of the tow point on the generator;

FIG. 29 is a front elevation view of the driving mechanism shown in FIG. 28, with two trucks side by side, with the drive drum underneath, wherein the cable can be wound onto the drive drum, and pulled through the water, to drive the generator across the body of water.

DETAILED DESCRIPTION OF THE INVENTION

Figure 1:
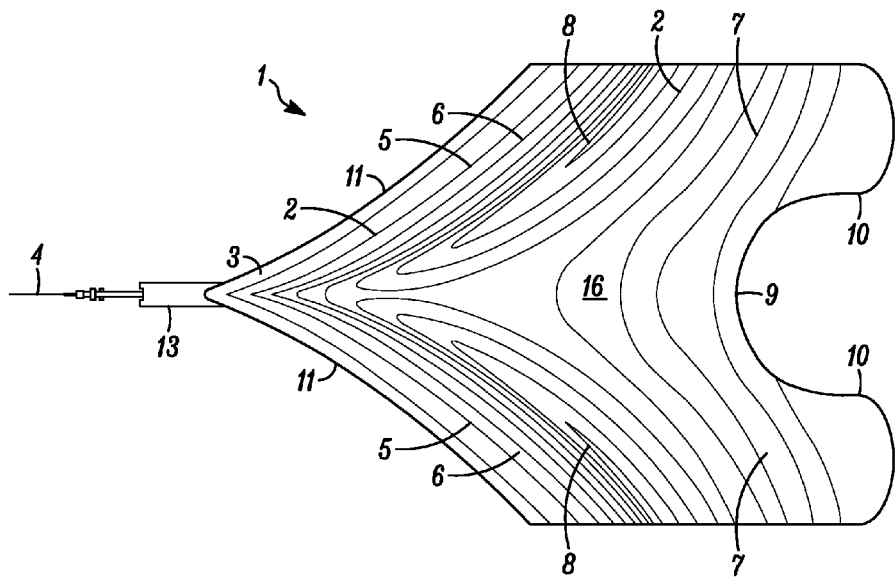
FIG. 1 is a plan view of an embodiment of the wave generator of the present invention, consisting of two wave generator hulls extended on the upper surface thereof, with contoured topographical lines showing the curvature thereof, wherein the front of the generator is substantially a vertex leading V shape, and has a leading edge that helps lift up a slice, slab or sheet flow of water, wherein the generator has flow-forming surfaces on the top, and a relatively deep U shaped profile along the aft end.

The wave generator of the present invention, as shown in the various figures, is substantially in the overall shape of a triangular wing, and in the embodiment of FIG. 1, generator 1 preferably has a forward extending center section 3, from which is extended a tow connector 15, from which generator 1 can be pulled by a cable or rope 4 through the water. Generator 1 also preferably has symmetrically formed curved wave generator hulls 5, with curved flow-forming surfaces 6, extending upward and rearward therefrom. The generator is preferably positively buoyant so it can float on the water surface and be pulled substantially across or through a body of water. Positive buoyancy is preferred in the subject generator design since dynamic balancing requires a starting point, and for this embodiment, a visible floating generator is preferred from a safety and signage perspective.

For purposes of this discussion, unless otherwise indicated, "forward" refers to the direction that the generator travels through the water, and "rearward" will refer to the opposite direction, wherein "front" or "forward" refers to the side that faces the travel direction, and "backward" or "rearward" refers to the opposite direction.

FIGS. 1 to 7 show a first embodiment 1 with forward section 3, a pair of wave generator hulls 5, extending upward and outward laterally on both sides, a pair of hydrofoil sections 7 extending back on either side, and a U shaped edge profile 9 in the center along the aft end 10. The overall exterior shape of embodiment 1, as shown in FIG. 1, preferably comprises a V shaped front, with a vertex forward curved edge 11, wherein the overall angle formed by leading edge 11 relative to a centerline that extends from front to aft through forward section 3, preferably creates waves having a peel angle of about 40 to 50 degrees (although they can range from about 30 to 70 degrees), which represents the approximate angle at which a wave created by the generator would travel across the water relative to the travel direction of the generator.

Figure 7:
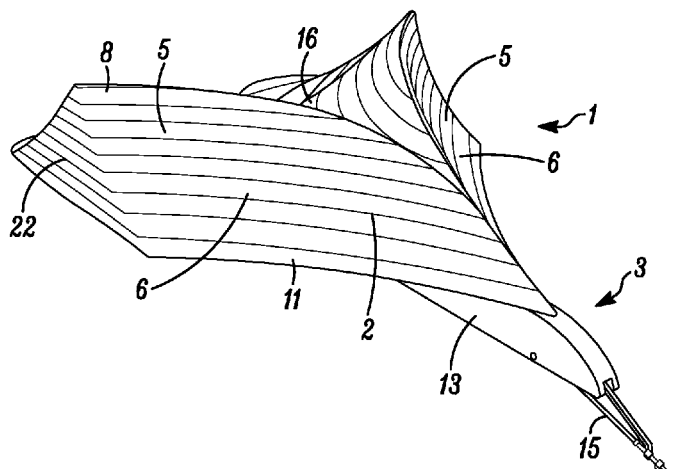
FIG. 7 is a perspective view of the embodiment of FIG. 1, showing multiple contoured topographical lines representing the overall curvature of the generator.

The contoured topographical lines 2, shown in FIGS. 1 and 7, show the approximate shape and curvature of the upper exterior surface of generator 1 and in particular hulls 5. For example, it can be seen that hulls 5 have flow-forming surfaces 6 that preferably comprise horizontal and vertical curvatures, such that, during operation, as a slice, slab or sheet flow of water is pared and lifted up by leading edge 11, water will be accelerated upward and forward, above the surrounding body of water, so that the force of gravity can overcome its upward and forward momentum, causing it to fall back down in a curving arc, to the base of the advancing wave, wherein, if the forward and upward momentum of the water is sufficient enough, its path will form a substantial loop, wherein, as the water stacks on top of itself, it will eventually curl forward and back down again, wherein a curling wave shape can be created.

Figure 2:
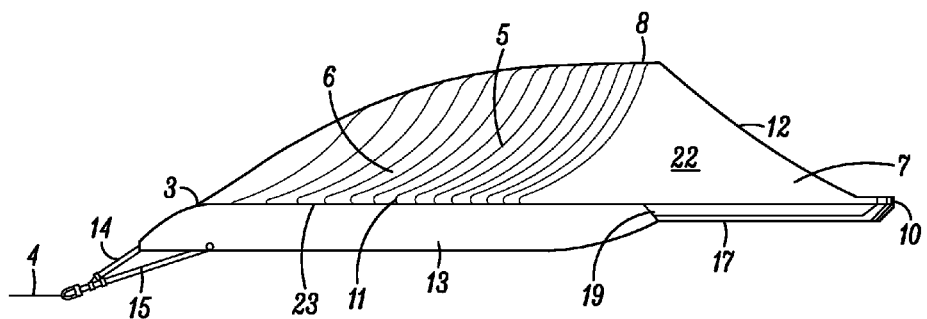
FIG. 2 is a side view of the embodiment of FIG. 1, with contoured lines showing the curvature of the wave forming surfaces, as well as a lower keel, and rear inclined stepped area, wherein a forward extending tow connector is provided underneath.

In this embodiment, aft end 10 preferably comprises a relatively deep U shaped edge profile 9, which provides certain advantages. For example, this not only reduces the amount of material needed to construct the generator, which reduces the cost and weight thereof, but it can also reduce the amount of hydrodynamic friction or drag that can be experienced as the generator travels through the water. Centralizing the U shape in the middle of the generator also provides a stabilizing effect, wherein hydrodynamic forces will tend to be equalized on both sides, i.e., as the generator displaces water and water behind the generator rises due to the restoring force of gravity, water will rise centrally through the U shaped opening, which helps to centralize and stabilize the forces acting upon the generator as it travels through the water. Furthermore, by adjusting the cut-out size of the U-shaped section, one can adjust the planing characteristic of the generator, i.e., one can adjust the amount of lift on the aft section of the generator hull. FIG. 2 is an elevation view of embodiment 1 showing front section 3 extending forward, and curved flow-forming surfaces 6 of wave generator hulls 5 extending upward and rearward therefrom, with leading edge 11 along the bottom thereof. Below hulls 5 is preferably a lower keel 13 extending substantially longitudinally from front to aft, substantially in the middle of generator 1. Preferably, keel 13 is submerged in the water and helps to keep the generator stable as it moves forward, similar to a keel of a boat. Preferably, while keel 13 extends all the way forward, it does not extend all the way aft, as will be discussed.

Figure 23:
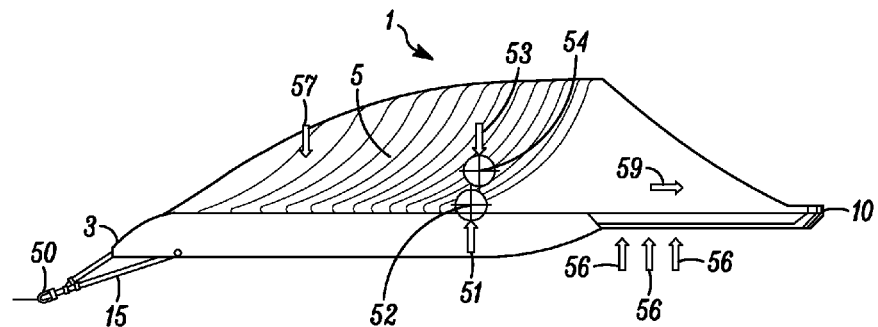
FIG. 23 is a schematic elevation view showing the various counteracting forces that can be applied to the wave generator as it travels through the water, which help to maintain its stability and equilibrium in the water.
Figure 25:
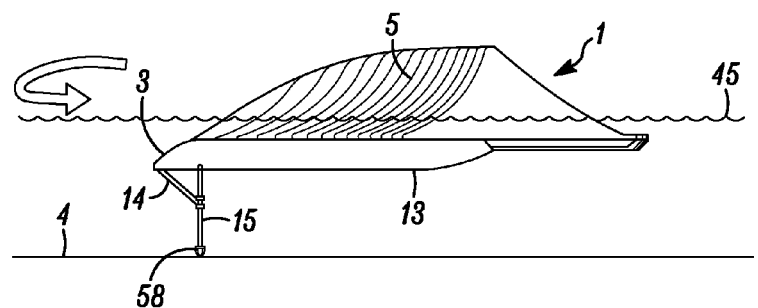
Figure 26:
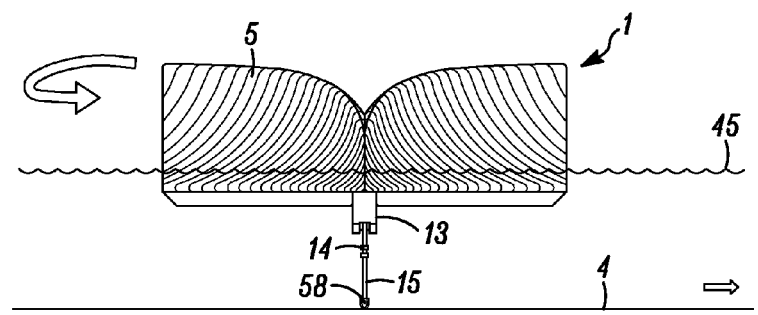

At or near the forward end of keel 13 is preferably secured thereto a tow connector 15 that can be extended substantially down and forward on or adjacent front section 3, as shown in FIG. 2, wherein the cable or rope 4 that pulls generator 1 through the water can be secured to the distal end thereof. Tow connector 15 is preferably a rod or other elongated member pivotally connected to keel 13, so that it can pivot from an upper/forward position, as shown in FIG. 2, to a substantially vertical lower position, as shown in FIGS. 25 and 26. A stop 14, preferably comprising another pivoting rod or member with a sleeve wrapped around tow connector 15, is preferably provided adjacent tow connector 15, wherein stop 14 helps to prevent connector 15 from pivoting too far forward or too far backward—it is preferably designed to stop tow connector 15 at the appropriate tow point 50, as shown in FIG. 23. Additional discussion about the advantages of tow connector 15 and how it works to keep the generator stable in the water will be provided later.

As shown in FIGS. 1 and 2, the upper rearward section 12 of generator 1 is preferably sloped down from an upper ridge 8 extending above flow-forming surface 6, and into a valley area 16, which extends down toward lower hydrofoil sections 7, which are preferably tapered and end up relatively flat and horizontal at aft end 10. The rearward portion or half 12 of generator 1 preferably comprises a downward slope, which is preferably curved, first convex, and then concave, forming valley area 16 in the middle, with U shaped edge profile 9 at aft end 10. The curved configuration of the upper exterior surface of generator 1 preferably helps to allow water flowing over generator hulls 5 to be easily cleared and transitioned back into the body of water without creating undue turbulence. Thus, preferably, rather than having an abrupt vertical drop behind generator hulls 5, the exterior surface is preferably curved, wherein the goal is to enable water to transition down smoothly behind generator 1 as it passes by. This configuration can generally be seen via the topographical contour lines 2 that extend across the exterior surface of wave generator 1, in FIGS. 1 and 7.

The bottom surface 23 of embodiment 1 preferably comprises downward facing stepped areas 17 that extend down from the bottom surface 23 of lower hydrofoil sections 7, below rear section 12, preferably along the rearward portion of generator 1, i.e., such as rearward of keel 13 toward aft end 10, as shown in FIG. 2. The preferred shape of these stepped areas 17 can be seen in FIG. 3 which is a bottom view of generator 1. Particularly significant is the forward facing inclined surface 19 that extends downward at an angle relative to bottom surface 23, along the front of stepped areas 17, which preferably extend transverse to the forward direction of travel. As can be seen, the two stepped areas 17 are preferably substantially identical, but inversely shaped, and provided on either side of keel 13, surrounding U shaped edge profile 9, on opposing sides of generator 1, with each stepped area 17 having a forward facing inclined surface 19. This inclined surface 19 is preferably configured to act upon the water flowing underneath generator 1, which can, in turn, create an upward lift against aft end 10, as the generator travels through the water.

Figure 3:
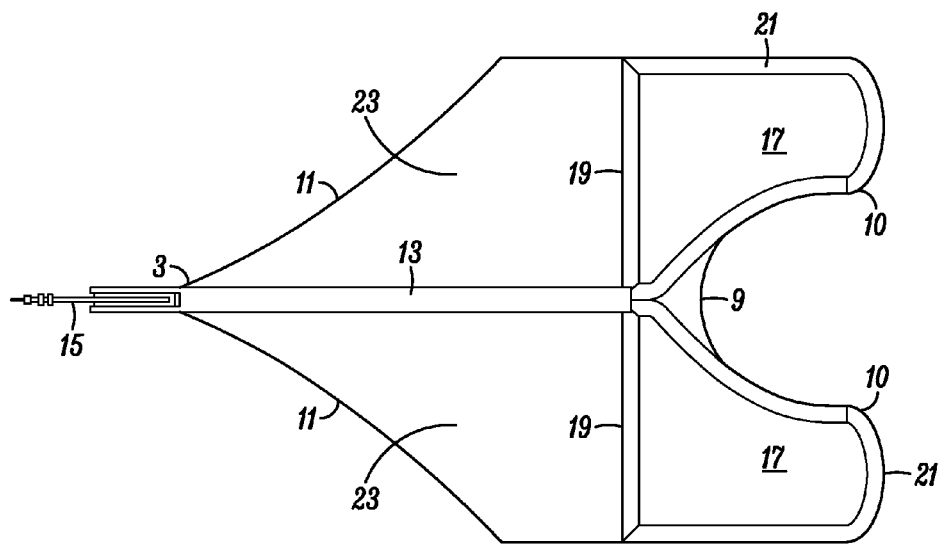
FIG. 3 is a bottom view of the embodiment of FIG. 1, showing the overall shape of the bottom surface of the wave generator, including the rear inclined stepped area, the shape of the keel underneath, and the tow connector at the front.

Additional beveled sections 21 can be provided around the periphery of stepped areas 17. The forward bottom surface 23 of generator 1, as shown in FIG. 3, is preferably substantially horizontal and flat, other than keel 13, thereby allowing water to encounter inclined surface 19 directly, while at the same time, generator 1 is preferably free to flow through the water without creating undue friction or turbulence.

Figure 4:
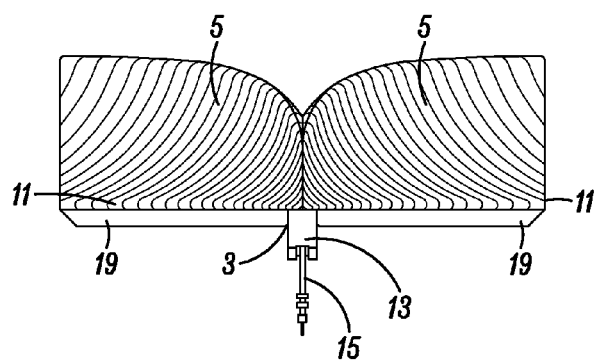
FIG. 4 is a front view of the embodiment of FIG. 1, with contoured lines showing the curvature of the wave forming surfaces, as well as the lower keel, the rear inclined stepped area and the forward extending tow connector underneath.

FIG. 4 is a front view of generator 1 showing the curved generator hulls 5, extending outward laterally and symmetrically on either side of forward section 3, with lower keel 13 extending below leading edge 11. It can be seen that inclined surface 19 on the bottom is visible from the front due to the fact that bottom surface 23 of inclined surface 19 is flat and horizontal, as explained above. This demonstrates how water flowing underneath generator 1 can encounter the forward facing inclined surface 19 and thereby create a lift force against lower hydrofoil sections 7 and therefore aft end 10.

FIG. 7 is an upper perspective view of the embodiment of FIG. 1 showing the overall configuration and curvature of the exterior surfaces of generator hulls 5. As can be seen, generator hulls 5 are extended substantially laterally and upwardly from forward section 3, on either side thereof, with a pair of curved flow-forming surfaces 6 thereon, which represent the forward facing surfaces that act upon the sheet flow of water, both vertically and laterally, to create a pair of curling and laterally extended wave shapes that spill into the water.

This view shows how forward section 3 and lower keel 13 extend forward underneath generator hulls 5. This view also shows tow connector 15 extending downward and forward therefrom, wherein connector 15 is preferably capable of being attached to cable 4 to pull generator 1 through the water. In this embodiment, the outer periphery or sides 22 of generator 1 can be substantially vertical, as shown, although in other embodiments, the outer sides can be rounded or sloped. Note each topographical line 2 in FIGS. 1 and 7 represents a specific elevation, while at the same time, the contour lines shown in FIGS. 2, 4, 5 and 6, which are not topographical lines, represent lines formed by vertical planes extending through the curved surfaces to demonstrate how the surfaces are curved both laterally and vertically.

Figure 5:
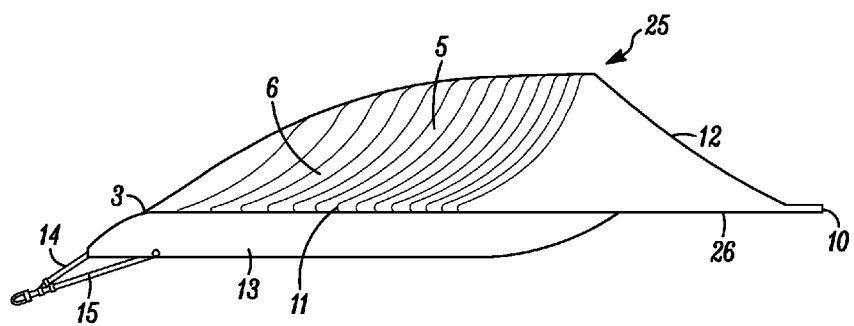
FIG. 5 is a side view of an alternate embodiment similar to that of FIG. 1, wherein this embodiment has a lower keel but does not have a rear inclined stepped area, wherein the bottom surface is otherwise substantially flat underneath, while the upper surface is similar to the embodiment of FIG. 1.

FIG. 5 shows an alternate embodiment 25, wherein the upper flow-forming surfaces 6 of generator hulls 5 and leading edge 11 that help to create the wave shapes are substantially similar to those found in embodiment 1. The difference is the bottom surface 26 which is substantially horizontal and flat all the way from front to back, i.e., from front section 3 to aft end 10, wherein bottom surface 26 does not have a stepped area 17, although it does have a lower keel 13 extending down. At the same time, forward section 3 is otherwise similar to forward section 3 of FIG. 1, i.e., a tow connector 15 is pivotally mounted thereto.

Figure 6:
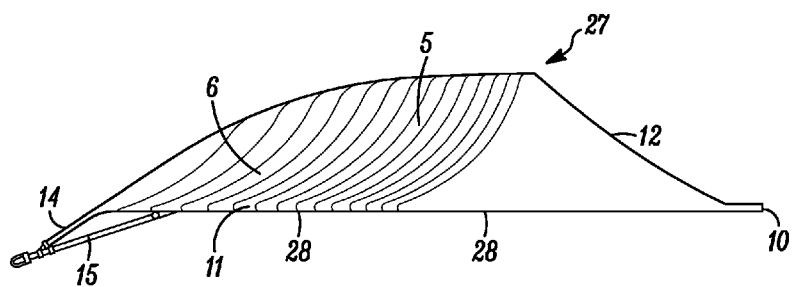
FIG. 6 is a side view of an alternate embodiment similar to that of FIG. 1, wherein this embodiment has no keel and no rear inclined stepped area, but rather, has a flat surface underneath, with an upper surface similar to the embodiment of FIG. 1.

FIG. 6 shows another alternate embodiment 27, wherein the upper flow-forming surfaces 6 on generator hulls 5 and leading edge 11 are substantially similar to those in embodiment 1. In this embodiment 27, however, the differences include the following: the bottom surface 28 of wave generator 27 is substantially horizontal and flat all the way from front to back, i.e., from front section 3 to aft end 10, and in this embodiment, there is no stepped area 17, as shown in FIG. 1, nor a longitudinal keel 13. Rather, it is preferably flat and horizontal all the way across bottom surface 28. Also, tow connector 15 is preferably extended forward and downward from front section 3, and unlike embodiment 1, which has a pivoting tow connector 15, this embodiment has a tow connector that is fixed and doesn't pivot, wherein stop 14 is preferably extended down and forward to hold tow connector 15 in a fixed position. It can be seen that tow connector 15 can otherwise be constructed in virtually any manner to provide the desired results.

Preferably, in these embodiments, the front of forward section 3 is rounded or made blunt, both vertically and horizontally, which helps to stabilize the movement of generator 1 through the water, by avoiding the creation of undue forces, up or down, relative to front end 3. Leading edge 11 is also preferably rounded, as shown by the contour lines of FIGS. 2 and 4, for the same reasons, but also to avoid the possibility of injuries occurring in the event a surfer falls and is struck by edge 11. Nevertheless, leading edge 11 is preferably adapted and shaped to pare and lift up a sheet flow of water onto generator hulls 5, as will be discussed, which can help create wave shapes that curl and break thereon.

Figure 14:
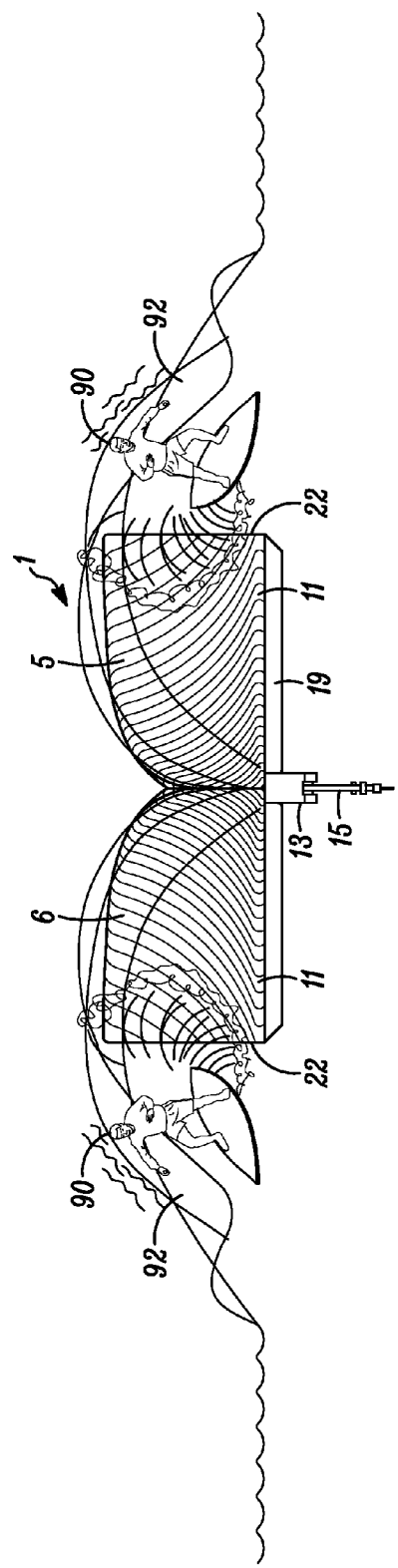
FIG. 14 is a front view showing the wave generator in operation as it travels through the water and creates curling wave shapes that extend laterally on either side of the generator, wherein two surfers are shown riding on the two wave shapes at the same time.

Because of the symmetrical configuration of generator hulls 5 extending on either side of forward section 3, generator 1 tends to divide the water it travels through, wherein hulls 5 preferably create two substantially identical but inversely shaped waves that extend in opposite directions on either side thereof. Due to forward section 3 being in the center, the water is preferably pushed upward but laterally outward in opposite directions, thereby creating two substantially identical but inversed wave shapes flowing in different directions, upon which two different riders can surf at the same time—as shown in FIG. 14. While in embodiment 1, generator hulls 5 are shown connected to each other in the center, two flow-forming surfaces 6 can also be formed as separate and distinct upward extensions, separated by a gap in the middle, one on either side (not shown).

Preferably, lower keel 13 is extended substantially vertically in the center of generator 1 and longitudinally from the forward bow to the aft end, to help keep generator 1 relatively stable as it travels through the water. While different size keels 13 with different shapes and sizes are contemplated, the one shown in FIGS. 1 to 7 extends substantially longitudinally from front to back, i.e., from front section 3 to a point about halfway between forward section 3 and aft end 10. It also preferably extends down a distance of about one third to one half the total height of hulls 5, i.e., relative to leading edge 11. The forward end of keel 13 preferably slopes down to a lower tip, and the aft end of keel 13 preferably slopes up to merge with bottom surface 23, as shown in FIG. 2. The lower longitudinal edge of keel 13 can be horizontal and flat to avoid unnecessary drag and friction, and the width of keel 13 is preferably substantially narrow compared to the width of generator 1.

Figure 8:
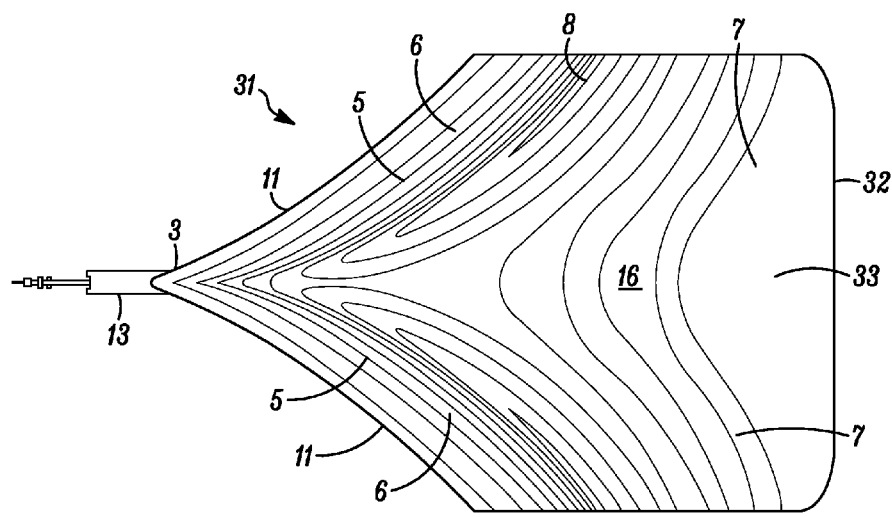
FIG. 8 is a top view of an alternate embodiment of the present invention with contoured topographical lines showing the curvature of the top surface of the generator, wherein this embodiment has a relatively straight profile along the aft end, and has a lower keel, rear inclined stepped area and forward extending tow connector underneath, similar to those of FIG. 1.
Figure 9:
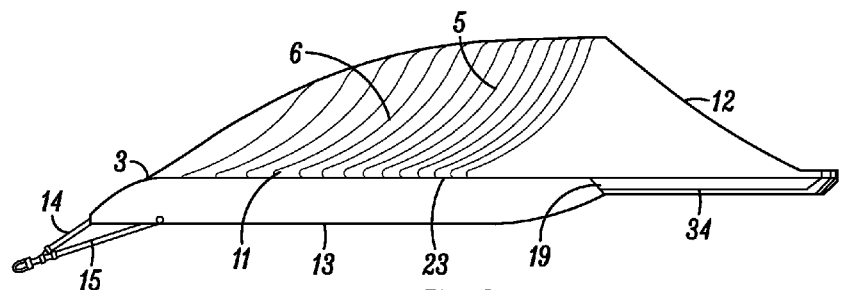
FIG. 9 is a side view of the embodiment of FIG. 8, with contoured lines showing the curvature of the wave forming surfaces, the lower keel, the rear inclined stepped area and the forward extending tow connector underneath.
Figure 10:
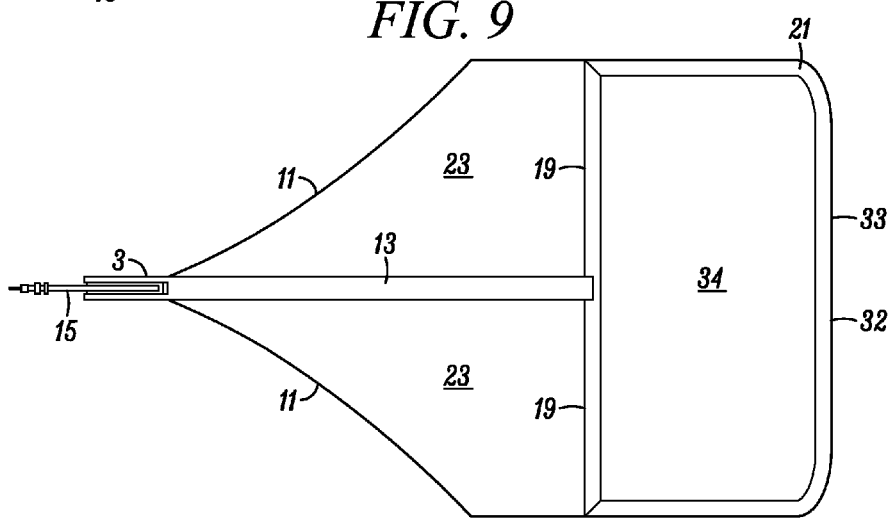
FIG. 10 is a bottom view of the embodiment of FIG. 8, showing the overall shape of the bottom surface of the wave generator, including the straight back edge profile.

Another alternate embodiment 31 is shown in FIGS. 8 to 10. In this embodiment, 31, the general shape and curvature of hulls 5 is substantially identical to those of embodiment 1. For example, embodiment 31 has a forward section 3, and a pair of generator hulls 5, with flow-forming surfaces 6, extending outward laterally and symmetrically on both sides thereof, as well as a central valley 16 and two lower hydrofoil sections 7 on either side toward aft end 33. The overall exterior shape of embodiment 31, as shown in FIG. 8, also preferably consists of a general V shape from above, with a curved edge 11 along the front, wherein the overall angle formed by leading edge 11 relative to a centerline that extends from front to back, through front section 3, preferably creates waves with a peel angle of about 40 to 50 degrees, which represents the approximate angle at which waves would travel across the water surface from generator 1.

As shown in FIG. 10, however, which is a bottom view of embodiment 31, this embodiment has a different back edge profile 32, which is straight rather than U shaped. This embodiment, 31, like embodiment 1, has a lower keel 13 extending longitudinally through the middle, with a tow connector 15, but because this embodiment has a straight back edge profile, it preferably has a single stepped area 34, with a forward facing inclined surface 19 and beveled surfaces 21, as shown in FIGS. 9 and 10, rather than two separate stepped areas 17, as shown in FIG. 3. That is, stepped area 34 comprises a single contiguous surface. While a straight back edge profile 32 does not provide the same advantages as U shaped profile 9, this embodiment 31 enables greater lift to be created in the aft end, which can be advantageous in allowing generator 31 to counteract the opposing forces that can be exerted against generator 31 as it travels through the water.

Figure 11:
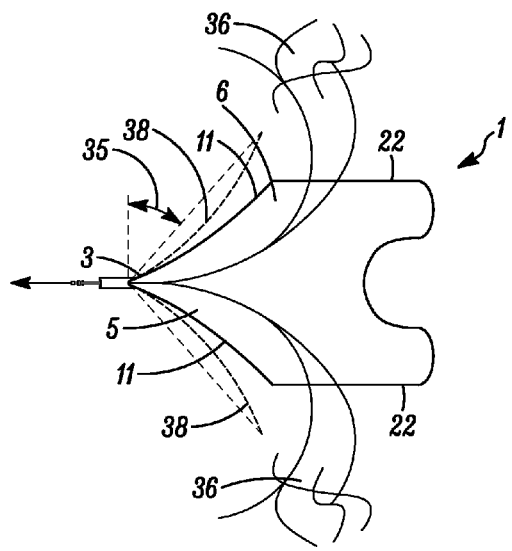
FIG. 11 is a schematic plan view of the embodiment of FIG. 1, showing how the angle and curvature of the leading edge helps to create a wave having a particular peel angle, which in the preferred embodiment, is between about 40 to 50 degrees.

FIG. 11 shows embodiment 1 and how it can create waves 36 having a specific peel angle 35, which in this embodiment is preferably about 40 to 50 degrees. For example, embodiment 1 preferably produces waves that extend along a base 38 having a peel angle 35 that extends about 40 to 50 degrees relative to a line perpendicular to a front to back centerline extending through front section 3. The term peel angle refers to the angle at which the line defined by the base 38 and/or crest of wave 36 produced by generator 1 lies in relation to a line perpendicular to the centerline of generator 1. And while the physical curvature and angle of leading edge 11 may actually be greater than 40 to 50 degrees—it can be anywhere from 50 to 60 degrees or more relative to a line perpendicular to the centerline—it can be seen that waves 36 created by generator 1 will extend further out, and at a lessor angle, due to the fact that water stacks up against flow-forming surfaces 6, and builds up and thickens as the water flows laterally across and toward outer edges 22 of hulls 5.

Figure 12:
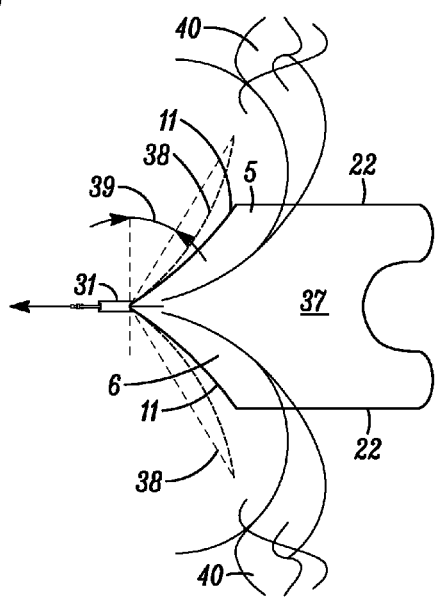
FIG. 12 is a schematic plan view of an embodiment similar to that of FIG. 1, but that creates a wave having a curved peel angle of roughly 50 to 70 degrees on either side thereof.

FIG. 12 shows another embodiment 37, which has leading edge 11 with a greater curvature and angle and that can produce waves 40 having a lessor peel angle 39 that preferably extends about 20 to 40 degrees relative to a line perpendicular to a front to back centerline extending through front section 3. Again, the term peel angle refers to the angle at which the line defined by the base 38 and/or crest of a wave 40 produced by generator 37 lies in relation to a line perpendicular to the centerline of generator 37. And while the physical curvature and angle of leading edge 11 of generator 37 may actually be greater than 20 to 40 degrees—the actual angle can be anywhere from about 40 to 50 degrees or more—it can be seen that waves 40 created by generator 37 will extend further out, and at a lessor angle, due to the fact that water stacks up against flow-forming surfaces 6, and builds up and thickens as the water flows laterally across and toward outer edges 22 of hulls 5.

Figure 13:
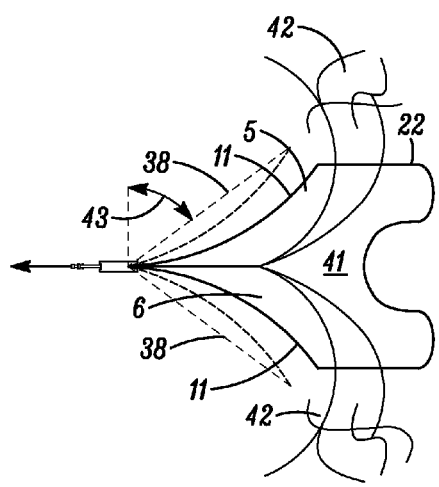
FIG. 13 is a schematic plan view of an embodiment similar to that of FIG. 1, but that creates a wave having a curved peel angle of roughly 25 to 40 degrees on either side thereof.

FIG. 13 shows another embodiment 41 that has a leading edge 11 with a shallower curvature and angle that can produce waves 42 having a greater peel angle 43 that preferably extends about 50 to 65 degrees relative to a line perpendicular to the front to back centerline extending through front section 3. Again, the term peel angle refers to the angle at which the line defined by the base 38 and/or crest of a wave 42 produced by generator 41 lies in relation to a line perpendicular to the centerline of generator 41. And while the physical curvature and angle of leading edge 11 of generator 41 may be greater than 40 to 65 degrees—the actual angle can be anywhere from about 65 to 75 degrees or more—it can be seen that waves 42 created by generator 41 will extend further out, and at a lessor angle, due to the fact that water stacks up against flow-forming surfaces 6, and builds up and thickens as the water flows laterally across and toward outer edges 22 of hulls 5.

FIG. 14 is a drawing showing generator 1 of the present invention in operation being pulled through the water, wherein two surfers 90 are shown riding on regular surfboards, on two different but substantially identical inverse wave shapes 92 created and curling on opposing sides thereof. Note that waves 92 are formed such that they flow across generator hulls 5, and spill outwardly and laterally toward outer edges 22, wherein as the sheet flow of water collects and thickens across hulls 5, it creates a relatively thick sheet flow that curls outwardly and downwardly, back into the surrounding water. Also note that the flow of water creates a trajectory in the form of a moving wall of water outside of outer edges 22, on which surfers 90 are able to ride and maneuver, wherein the force and momentum of the water helps to propel the surfer forward, wherein the wall of water supports the weight of the surfer 90 on waves 92.

In this respect, it can be seen that waves 92 are actually wave shapes that have two different sections or components. First, within the width of generator 1, wave shapes 92 are similar to wave formations created by the Flow Rider®, insofar as a sheet flow of water is created on the curved generator hulls 5, wherein the water flows up and laterally across the flow-forming surfaces 6, and takes the shape of the generator hulls 5, wherein hulls 5 support the weight of the water flowing thereon. The thickness of the sheet flow of water as it builds up on hulls 5 and flows laterally toward outer sides 22 enables regular surfboards with fins to be used. Second, extended outside the width of generator 1, the wave shape is necessarily hollow underneath, since, outside generator 1, there is no physical support for the sheet flow of water flowing and spilling therefrom. Instead, the force and momentum of the water spilling across hulls 5 carries the moving wall of water across and keeps it in its shape, wherein surfer 90 can continue to ride on the wave shape as it moves forward due to the forward momentum of generator 1 and the wall of water. For this reason, it can be seen that it is important that generator 1 be pulled with sufficient velocity to cause a sufficient amount of upward and lateral or longitudinal momentum, which helps to not only create the wall of water, but allows it to hold its shape, even as it spills from outer edge 22, wherein no physical support is available underneath to support the wave shape.

Figure 16:
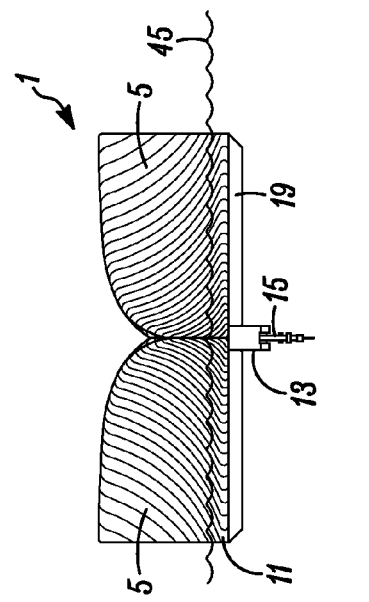
FIGS. 15 to 20 represent time lapse views, including elevation and front views, side by side, of the embodiment of FIG. 1 in operation, including the following.
Figure 15:
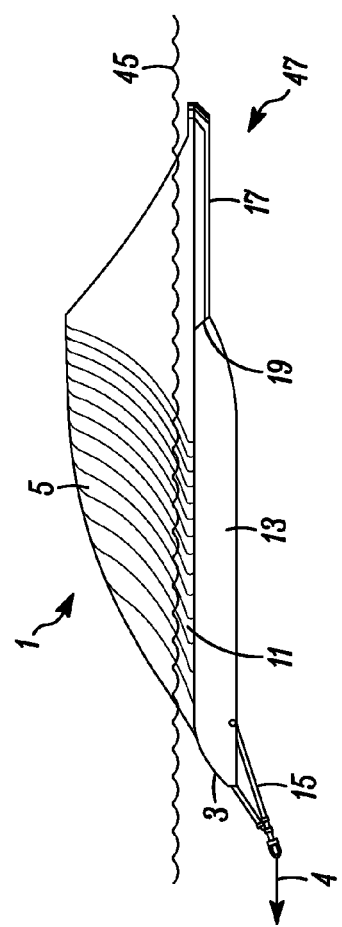
Figure 18:
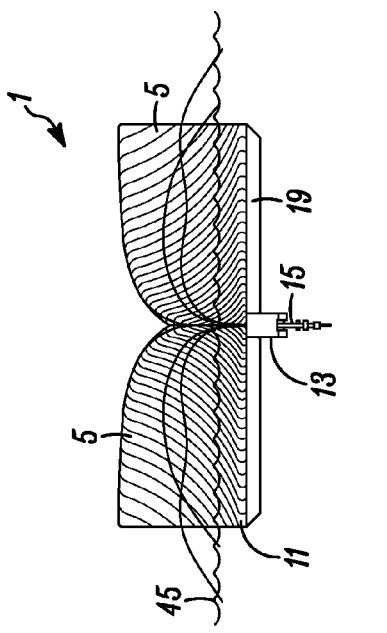
Figure 17:
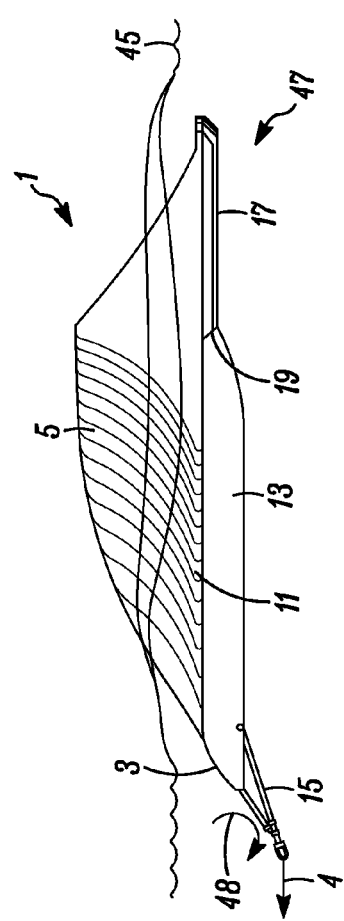
Figure 20:
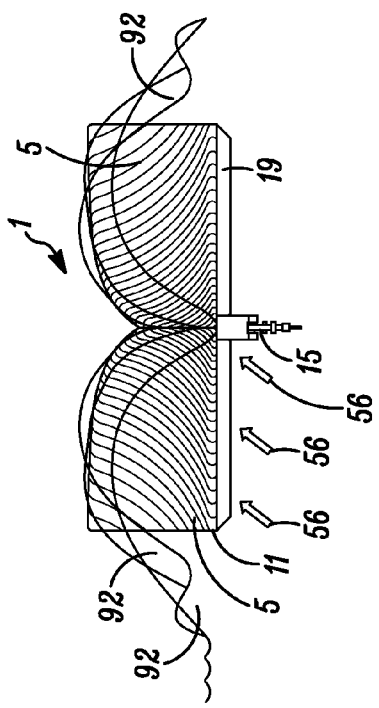
Figure 19:
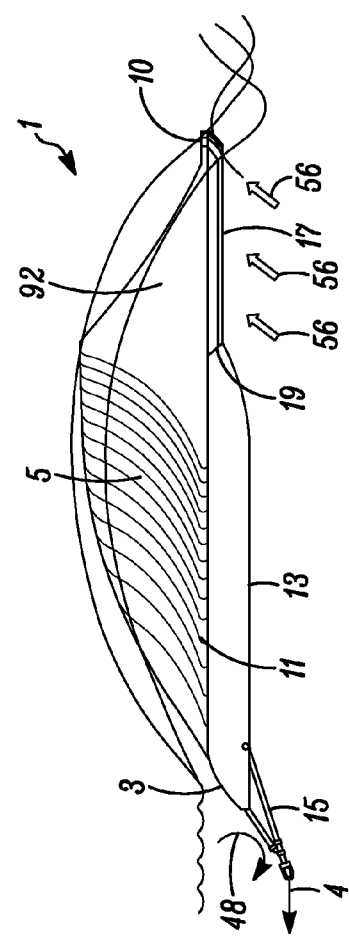

The standard operation of generator 1 can be seen in FIGS. 15 to 20, which represent time lapse views of generator 1 travelling through a body of water 47, wherein FIGS. 15 to 16 show the generator at rest, FIGS. 17 to 18 show the generator during initial acceleration, and FIGS. 19 to 20 show the generator during operation such as at full speed.

FIGS. 15 and 16 show side and front views of generator 1 floating at rest (positively buoyant) in body of water 47, with wave generator hulls 5 extending up above leading edge 11, wherein leading edge 11 and keel 13, etc., remain submerged within body of water 47, as shown relative to the static water level 45. Because leading edge 11 is what travels through the water, to pare and lift up a slab, slice or sheet flow of water onto hulls 5 to form the wave shapes, it can be seen that the depth and thickness of the sheet flow that flows onto and across hulls 5 will be determined largely by the depth at which leading edge 11 travels relative to water surface 45. And, because the consistency with which the water flows onto and across generator 1 is also determined by the depth of leading edge 11 relative to water surface 45, by keeping the depth of leading edge 11 consistent, consistent wave shapes can then be formed. Note that in FIG. 15 tow connector 15 is shown as it is beginning to be pulled by cable 4, insofar as connector 15 is shown in its upward pivoted position.

When generator 1 begins to accelerate, as shown in FIGS. 17 to 18, it can be seen that leading edge 11 will begin to pare and lift up a slab, slice or sheet flow of water, onto generator hulls 5, causing water to flow up and across laterally, along the flow-forming surfaces 6. At the same time, the lifting of water will create a reciprocal downward force, acting on the front end of generator 1, wherein, at a relatively slow speed, the water will tend to build up and flow across and onto the lower portions of hulls 5. At this point, it can be seen that generator 1 will tend to sink further into the water as it begins to accelerate forward, and therefore, a relatively large amount of water will begin to be lifted up onto hulls 5 by the forward movement of generator 1. Notice how the slab, slice or sheet flow of water being lifted onto hulls 5 will begin to thicken as generator 1 travels through the water, wherein the weight and force of the water flowing onto generator 1 will tend to create a greater downward force, which in turn, will cause generator 1 to travel even deeper in the water. At this point, the speed of generator 1 is too slow to cause generator 1 to begin to plane upward, which can eventually create a thinner sheet flow. Instead, water flowing up and onto leading edge 11 is simply pushed up and laterally across and onto generator hulls 5, wherein water spills across and back into body of water 47.

As generator 1 accelerates, additional force is applied to tow connector 15, by virtue of cable 4 pulling on generator 1. In this respect, a preferred feature of the invention relates to the location and position of tow connector 15, as shown in FIGS. 15, 17 and 19, which is substantially down and forward relative to front section 3 and down relative to the generator's center of buoyancy. In addition to having cable 4 connected to the forward tip of tow connector 15, connector 15 preferably extends down and forward underneath generator 1, and preferably, below the generator's center of buoyancy, such that when cable 4 pulls generator 1 through the water, it will create a "negative" moment force shown as 48 on the bow of generator 1, which in turn will create an upward force thereon. As will be discussed in more detail in connection with FIG. 23, preferably, tow connector 15 is connected to cable 4 at a tow point 50, which is below the generator's center of buoyancy, which means that as cable 4 pulls generator 1 through the water, a negative moment force will be created, wherein, as the speed and force of cable 4 moving forward is increased, so will the upward force and momentum applied against forward section 3. The reason this is significant is because this is what helps offset the other downward forces acting on generator 1, such as the weight and change of momentum and upward acceleration and force of water flowing on generator hulls 5, as generator 1 travels through the water.

As generator 1 accelerates and picks up speed, it will eventually be in full operation mode, as shown in FIGS. 19 and 20, travelling through the water and creating full curling wave shapes 92 upon which surfing maneuvers can be performed, as shown in FIG. 14. As seen in FIG. 19, as generator 1 picks up speed, and as cable 4 continues to pull generator 1, the negative moment 48 created by cable 4 will increase, in which case, the upward lifting force on front section 3 will also increase, in which case, it will begin to overcome and counteract the downward force resulting from the water being pared and lifted up by leading edge 11, and flowing onto hulls 5, wherein, the upward force created by cable 4 will eventually cause front section 3 and generator 1 to rise back up, until generator 1 reaches an equilibrium depth and position in the water, which preferably occurs at the ideal speed for surfing, such as 20 to 23 feet (6 to 7 meters) per second, although the actual speed can range from about 10 to 46 feet (3 to 14 meters) per second. In this position, it can be seen that, as generator 1 travels through the water, leading edge 11 will also travel at a substantially constant depth in the water, wherein a substantially consistent sheet flow of water can be lifted up onto generator hulls 5, to create consistent wave shapes 92. The rising of wave generator 1 will cause thinning of the sheet flow of water which preferably helps to reduce the amount of water flowing on generator 1, which also reduces the downward force on front section 3, as well as reduces the friction against generator 1, which in turn, will allow generator 1 to travel faster using less energy. However, in the preferred embodiment, there is a limit to the extent to which the sheet flow will thin, since a sufficiently thick flow of water flowing over generator 1 is needed to avoid surfboard fins from hitting the generator hull 5 surface. At the same time, the opposing moment forces—the negative moment force 48 created by pulling on tow connector 15, and the positive moment force created as water is lifted up onto hulls 5—help to off-set each other, which helps to keep generator 1 in substantial equilibrium.

FIG. 23 diagrammatically shows the various positive and negative moment forces that can be created and applied against generator 1, along with the forward and rearward horizontal forces, and upward and downward vertical forces, that can be applied to keep generator 1 in substantial equilibrium as it travels through the water. The easiest way to explain how these forces interact with each other is by beginning with the static forces that can be applied including 1) the downward force of gravity applied by the weight of generator 1, and 2) the upward force of buoyancy applied by the buoyancy of generator 1. These two counteracting forces are designated by the arrow 51 representing the upward force of buoyancy, on one hand, and the arrow 53 representing the downward force of gravity, on the other hand. The center of gravity 53 is determined by the weight of generator 1 and how it is distributed across the shape of generator 1, and the center of buoyancy 51 is determined by the weight distribution of the water displaced by generator 1.

In this particular example, it can be seen that arrows 51 and 53 are off-set, meaning that the vertical centerlines for the center of gravity and center of buoyancy do not line up, which means that the vertical forces will create an internal moment force acting on generator 1, which will apply a rotational force that tends to cause generator 1 to want to rotate clockwise around the center of buoyancy 51. The fact that these centerlines do not line up means that an internal moment force is created between them, i.e., the upward force of buoyancy, on one hand, and the downward force of gravity, on the other, are not aligned, and by virtue of these two forces being applied concurrently, an internal moment force is created, which tends to cause generator 1 to rotate to reach equilibrium. Thus, generator 1 will have to be rotated slightly until the two centerlines line up for the generator to be in static equilibrium.

The amount and extent of this off-set can be predetermined depending on the desired amount of moment force that is to be off-set, i.e., such as those produced by the hydrodynamic forces applied against generator 1. That is, by virtue of positioning the two centerlines in the manner shown in FIG. 23, a slight moment force in a clockwise direction (referred to as a "negative" moment) can be created, which can help to provide an upward force to lift front end 3, which in turn, counteracts the downward force (a "positive" moment) induced by the weight and force of the water acting on the front of generator 1. Note the weight and force of water being lifted up onto generator 1 creates a "positive" moment about the center of buoyancy and applies a downward force against the front of generator 1.

The significance of the center point of buoyancy 51 is that any force applied to generator 1 that is not aligned with the center of buoyancy 51 will create an internal moment force that will translate into either a downward or upward force on the front end 3 of generator 1, depending on whether the moment is positive or negative. For example, because tow point 50 is below the center of buoyancy 51, any pulling force applied by cable 4 against tow point 50 on tow connector 15 will tend to create a negative moment force, which in turn, creates an upward force against forward section 3, which can then help off-set the downward force created by the weight and force of water flowing onto generator hulls 5.

In this respect, it can be seen that the center of gravity and center of buoyancy each have a longitudinal component which represents the longitudinal center of gravity and longitudinal center of buoyancy, which, along with the vertical centerlines described above, form a center point for each force, including a center point of gravity 54 (indicated by the cross in the middle of the circle), and a center point of buoyancy 52 (indicated by the cross in the middle of the circle). The fact that these points do not line up, either horizontally or vertically, means that a moment force has been created between them, i.e., the upward force of buoyancy, on one hand, and the downward force of gravity, on the other, and by virtue of these two forces being applied concurrently, a rotational force is created, which tends to cause generator 1 to rotate to reach equilibrium. Note that while the preferred embodiment 1 shows the center of gravity 53 slightly behind the center of buoyancy 51—wherein this imposes a clockwise negative moment force on generator 1—other regimes with no off-set, or where the off-set is greater or less, or where the center of gravity 53 is in front of the center of buoyancy 51, are contemplated.

Additional moment forces can also be created by virtue of additional forces acting around the center of buoyancy 52. For example, another moment force can be created along aft end 10 due to the force of water acting on stepped area 17, and inclined surface 19, as generator 1 travels through the water, which are represented by arrows 56 in FIGS. 19, 20 and 23. That is, as generator 1 travels forward, water underneath generator 1 will be pushed down by inclined surface 19, which imparts a reciprocating upward force against aft end 10 (see arrows 56 in FIGS. 19 and 20), which in turn, creates an opposing moment force against aft end 10, which in turn, creates a downward force on the front end of generator 1. Alternatively, in an embodiment without a stepped section 17, and inclined surface 19, a solution would be to increase the area of hydrofoil section 7, and bottom surface 26, to provide additional upward planing lift and the corresponding moment force against aft end 10. These forces can help to counteract the negative moment force applied against the front end 3 by virtue of the tow connector being pulled beneath the center of buoyancy. These counteracting forces preferably help keep generator 1 in substantial equilibrium, as generator 1 travels through the water.

Another force that applies a negative moment is the force of water flowing against the top of hulls 5, in a direction from forward to aft, against the upper part of flow-forming surfaces 6, wherein this force pushes against the upper portion of generator 1, which in turn, creates a negative moment about the center of buoyancy 52. This is due to the fact that the upper part of flow-forming surface 6 is generally above and extends behind the center of buoyancy, wherein a force applied laterally against hulls 5 will impart a negative moment about the center of buoyancy 52.

The fact that generator 1 is pulled through the water also creates hydrodynamic drag and friction, represented by arrow 59 in FIG. 23, which translates into a negative force against the forward movement of generator 1. While cable 4 pulling on generator 1 will create a positive horizontal force in the direction of travel, an opposition negative force is created by friction and drag, and to the extent the forward pull of cable 4 creates a force that exceeds the negative force created by friction and drag, generator 1 will be pulled forward through the water. Note that tow line 50 creates a positive horizontal force that is equal to the drag, represented by arrow 59, plus a negative moment about the center of buoyancy.

Figure 21:
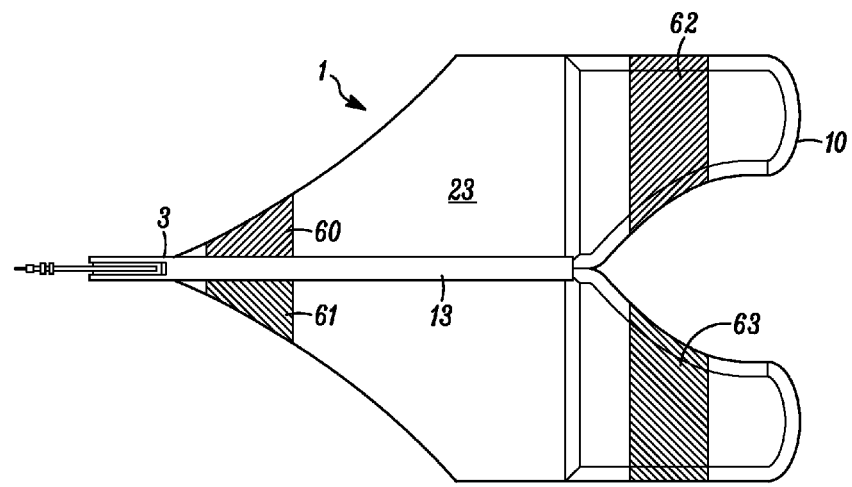
FIGS. 21 and 22 are plan and side views, respectively, of an embodiment showing possible locations for weight ballast tanks that can provide weight and buoyancy adjustments to the wave generator, wherein this embodiment has two ballasts near the front, and two ballasts near the aft region of the generator.
Figure 22:
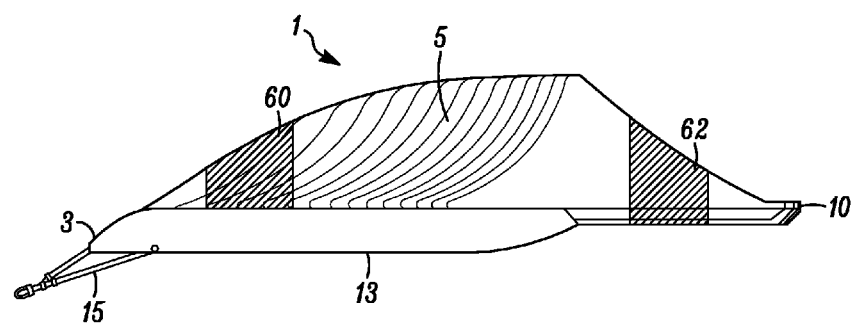

In FIGS. 21 and 22, weight ballasts are shown located throughout generator 1 to adjust the weight thereof in various locations. These ballasts can be used to affect the overall weight, and center of gravity, of generator 1, such as relative to the center of buoyancy, which can help create additional moment forces on generator 1. FIGS. 21 and 22 show two ballast tanks, 60 and 61, near front section 3, and two ballast tanks, 62 and 63, near aft end 10, on each hydrofoil section 7, wherein each tank can be filled with water or other weight adding substance, such as sand, etc. The number, size and location of ballasts can be adjusted to suit the needs of any particular application, wherein the goal is to use them to make adjustments to modify the weight of generator 1, as well as its center of gravity and center of buoyancy, etc., and how generator 1 travels through the water, i.e., for example, they can provide trim, depth and list adjustments.

Note that because the center of buoyancy is a function of the weight of the water displaced by generator 1, which is a function of its shape, and the center of gravity is a function of the internal weight and mass inside generator 1, it can be seen that these ballasts can be used to adjust the center of gravity, and to a lesser degree, the center of buoyancy. These ballasts can also be used to adjust the overall weight of generator 1, which can affect its overall buoyancy, which will have an effect on the centers of gravity and buoyancy combined.

It can be seen that all of the above forces can be adjusted by adjusting a number of factors, including without limitation, the following: 1) the weight, size and shape of generator 1, wherein the center of gravity can be adjusted by using weight ballasts and locating them in appropriate places, etc., 2) the buoyancy of generator 1 wherein the center of buoyancy can be adjusted by modifying its shape and the material from which it is made, and adjusting the weight and location of the ballasts, etc., 3) the distance tow point 50 is extended below (and forward of) the center of buoyancy, which can affect the extent of the negative moment created on forward section 3 as generator 1 travels through the water, 4) the off-set between the center of buoyancy and the center of gravity, if any, which can impose an additional moment on generator 1, 5) the depth at which leading edge 11 travels through the water, which is a function of various forces, including the buoyancy, size, weight and shape of generator 1, which can affect the depth and therefore weight of the sheet flow of water flowing onto the generator, and therefore, the downward force acting on the generator's front end, 6) the extent to which generator hulls 5 are sloped and configured to allow water to flow dynamically onto, over and across hulls 5, and 7) the overall hydrodynamic drag imposed against generator 1 as it travels through the water, which results from the factors described above.

The speed at which generator 1 is pulled through the water, which also affects the negative moment against front section 3, should also be taken into account, wherein the preferred speed of generator 1 is 20 to 23 (6 to 7 meters) feet per second, although speeds ranging from about 10 to 46 feet (3 to 14 meters) per second are contemplated. These speeds are preferably correlated with the normal speed at which a wave might travel though the ocean. In this respect, the design factors mentioned above are preferably taken into account and coordinated such that the ideal wave shapes, including their maximum amplitudes, will be created when generator 1 travels at a speed that substantially matches the speed of an actual wave travelling through the ocean, such that actual surfing conditions that replicate surfing on waves can be simulated and reproduced.

Figure 24:
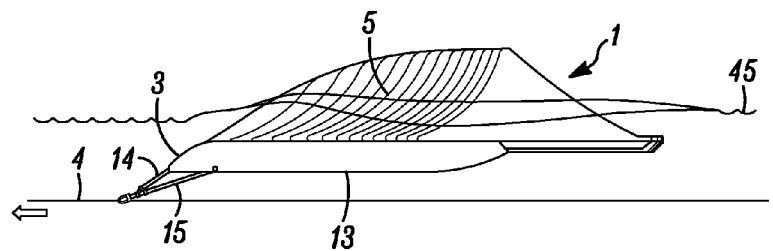
FIGS. 24 to 27 represent time lapse views showing how the wave generator travels across the body of water in one direction, and then, at the end of a run, pivots around, and travels back across the body of water in the opposite direction, including the following.

FIGS. 24 to 27 show how the wave generator can be adapted to easily pivot at the end of a run and then return across the body of water in the opposite direction. FIG. 24 shows generator 1 travelling through the water in a first direction, from right to left, wherein cable 4 pulls generator 1 partially submerged in the water in a substantially horizontal direction, wherein cable 4 is preferably connected to tow connector 15 below the center of buoyancy of generator 1 as discussed previously. The pulling force or tension of cable 4 preferably causes tow connector 15 to pivot up and forward to its furthest distal point as determined by the position of stop 14. Then, as generator 1 is pulled across the body of water and completes its run, cable 4 will begin to slow down, which causes tow connector 15 to pivot back down again, such as by gravity, as shown in FIG. 25, and then, as momentum carries generator 1 forward through the water, generator 1 will also rotate laterally around, about tow connector 15, which can occur by virtue of cable 4 slowing down and coming to a stop, or by slowly pulling cable 4 in the opposite direction, wherein generator 1 will spin about tow connector 15, which by then is extended substantially vertically down as shown.

Note that in the preferred embodiment tow connector 15 is preferably limited in a rearward direction beyond vertical by stop 14. Also, at its distal end, tow connector 15 preferably has a swivel joint 58, upon which cable 4 is connected, which can rotate around the center axis of tow connector 15, such that generator 1 can rotate freely about tow connector 15 without twisting or getting tangled with cable 4. FIG. 26 shows generator 1 in the middle of rotating around at the end of a run, wherein with cable 4 stopped, generator 1 continues to pivot about tow connector 15, which preferably remains extended in a substantially vertical position. Cable 4 can remain stationary while generator 1 rotates around, or, it can be pulled slowly in the opposite direction which will further facilitate the rotation of generator 1.

Figure 27:
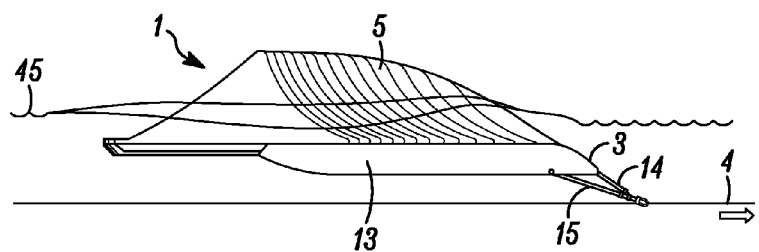

FIG. 27 shows how, as cable 4 is pulled in the opposite direction, generator 1 will complete its rotation and end up facing the other direction, wherein as cable 4 continues to be pulled in the opposite direction, from left to right, generator 1 will begin to travel in that direction, opposite the first direction, substantially across the water surface. At this point, as cable 4 pulls on tow connector 15, tow connector 15 will pivot up again, until it reaches its furthest distal point, which is restricted by the position of stop 14, wherein generator 1 can be pulled across the body of water via tow connector 15. Using these steps, cable 4 is able to pull generator 1 through the body of water, and then allow generator 1 to rotate at the end of a run, and then pull it back across the water in the opposite direction, wherein cable 4 is preferably adapted to pull generator 1 in both directions.

The preferred driving mechanism 70 that pulls generator 1 through the water is shown in FIGS. 28 to 32. Although virtually any type of drive mechanism that provides sufficient power to drive cable 4 and generator 1 can be used, preferably, driving mechanism 70 is located on the shoreline 71 of body of water 47 and comprises using vehicles, such as two trucks 72 with sufficient horsepower, positioned over driving mechanism 70, to power and drive a drum wheel 73, that allows cable 4 to be pulled with sufficient power across body of water 47.

Figure 30:
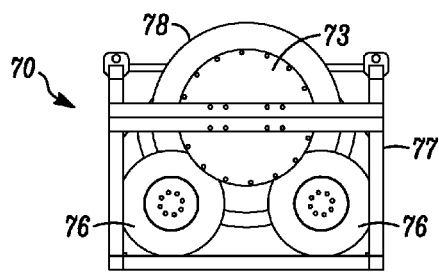
FIGS. 30 to 32 are detailed end, perspective, and elevation views, respectively, of the driving mechanism of FIG. 28, wherein these show the flanged outer edges and center support portions of the drive drum, and trailer spindles and wheels that support the drive drum.
Figure 31:
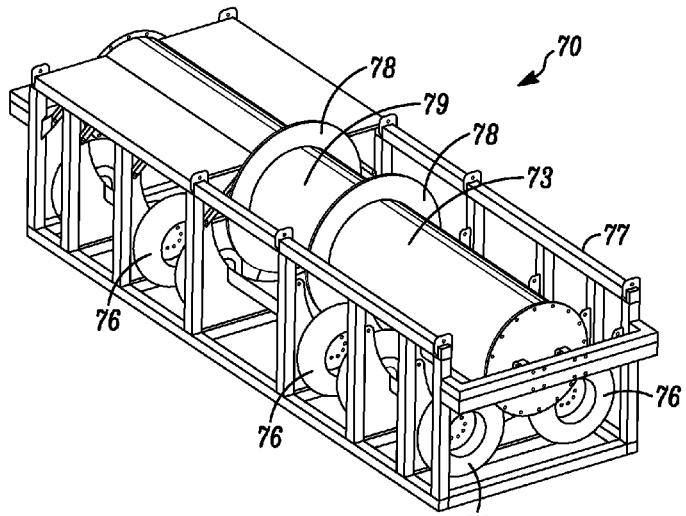
Figure 32:
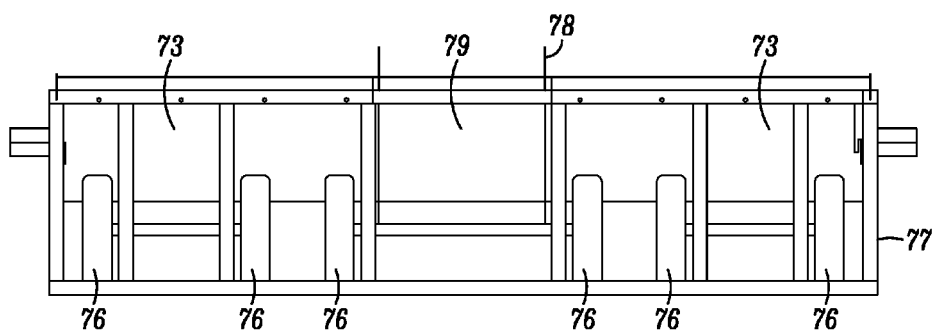

Preferably, as shown in FIG. 29, two trucks 72, which can be any conventional type with sufficient power, are positioned side by side facing body of water 47, and arranged over driving mechanism 70, wherein the truck's rear wheels/tires 75 are preferably adapted to engage drum wheel 73, such that, by causing the truck's wheels/tires to rotate, drum wheel 73 will also rotate, wherein there is sufficient friction between them to transfer rotation from the truck's wheels 75 to drum wheel 73. In this respect, drum wheel 73 is preferably a large drum that extends longitudinally from one end of driving mechanism 70 to the other, which is allowed to rotate relative to several supporting spindles and wheels 76 underneath, to maintain proper balance and support for drum wheel 73 to turn. Drum wheel 73 and supporting spindles and wheels 76 are preferably held by a frame 77, and as shown in FIGS. 30, 31 and 32, drum wheel 73 is preferably arranged on a single horizontal axis of rotation, while supporting spindles and wheels 76 are preferably arranged on two different horizontal axis of rotation, underneath drum wheel 73, with one in front and one in back, to provide proper support. Preferably, two flanges 78 are extended around the periphery of drum wheel 73, substantially in the middle of drum wheel 73—between trucks 72—on either side of a center portion 79 of drum wheel 73 upon which cable 4 can be wound. Preferably, drum wheel 73 has outer flanges on the ends to allow for expansion of the width of the drum surface to accommodate more trucks. Frame 77 is preferably anchored into the ground such that it will remain stationary as tension is applied to cable 4. Trucks 72 are preferably mounted securely above driving mechanism 70 such that they will remain stationary while their rear wheels/tires 75 rotate. It can be seen that if front wheel drive or four wheel drive trucks are used, the front wheels/tires can also be used.

Preferably, on or near shoreline 71, and positioned underwater within body of water 47, as shown in FIG. 28, a pulley system 80 is provided to help maintain cable 4 in a relatively horizontal position as it is being pulled through the water, despite how high up driving mechanism 70 might be relative to water surface 45. That is, even if driving mechanism 70 is located significantly above the water surface 45, cable 4 is preferably passed through pulley system 80, which helps to maintain cable 4 substantially at a constant horizontal level in the water, and preferably at a horizontal level that coincides with the furthest distal point of tow connector 15 on generator 1, i.e., tow point 50, such that as cable 4 pulls generator 1 through the water, the force and momentum applied to generator 1 by cable 4 will be substantially horizontal. This helps to keep generator 1 substantially stable as it travels across body of water 47.

Pulley system 80 preferably comprises a single pulley 81 that can rotate about an axis, wherein cable 4 is preferably passed underneath pulley 81, such that it can be maintained at a predetermined vertical orientation as cable 4 is pulled by driving mechanism 70. By allowing pulley 81 to rotate, and keeping it secured relative to the ground, the tendency for cable 4 to want to straighten out and pull up on generator 1 as it travels across the water can be reduced, thereby keeping cable 4 in its desired substantially horizontal orientation, as shown in FIG. 28.

What is claimed is:
1. A wave generator comprising:
a positively buoyant substantially laterally oriented body with flow-forming surfaces thereon, wherein said wave generator is adapted to be pulled substantially through a body of water, said wave generator having a predetermined center of buoyancy; and
a connecting member extended substantially below said center of buoyancy, wherein by pulling said wave generator via a cable secured to said connecting member, a negative moment about said center of buoyancy is created which generates an upward force on a front end of said wave generator, which helps to counteract a downward force created by a positive moment on said front end as said wave generator is pulled through said body of water and lifts water onto said wave generator: and wherein said wave generator has a lower keel extended in a fore and aft direction, wherein said connecting member is extended forward and downward from said keel.

2. The wave generator of claim 1, wherein said wave generator has a leading edge that is submerged within said body of water, wherein the depth of said leading edge within the water helps determine the amount of water lifted onto said wave generator, and therefore, the amount of force acting downward on said front end of said wave generator.

3. The wave generator of claim 2, wherein said flow-forming surfaces are extended above said leading edge, and are curved both horizontally and vertically to help create curling wave shapes thereon.

4. The wave generator of claim 1, wherein said wave generator has an aft section comprising a U-shaped edge profile.

5. A wave generator comprising:
a positively buoyant substantially laterally oriented body with flow-forming surfaces thereon, wherein said wave generator is adapted to be pulled substantially through a body of water, said wave generator having a predetermined center of buoyancy;
a connecting member extended substantially below said center of buoyancy, wherein by pulling said wave generator via a cable secured to said connecting member, a negative moment about said center of buoyancy is created which generates an upward force on a front end of said wave generator, which helps to counteract a downward force created by a positive moment on said front end as said wave generator is pulled through said body of water and lifts water onto said wave generator; and
wherein said connecting member comprises a pivoting rod with a stop that helps to keep said connecting member in a predetermined position below and substantially forward relative to said center of buoyancy.

6. The wave generator of claim 5, wherein said wave generator has
a leading edge submerged in said body of water.

7. A wave generator comprising:
a positively buoyant substantially laterally oriented body with flow-forming surfaces thereon, wherein said wave generator is adapted to be pulled substantially through a body of water, said wave generator having a predetermined center of buoyancy; and
a connecting member extended substantially below said center of buoyancy, wherein by pulling said wave generator via a cable secured to said connecting member, a negative moment about said center of buoyancy is created which generates an upward force on a front end of said wave generator, which helps to counteract a downward force created by a positive moment on said front end as said wave generator is pulled through said body of water and lifts water onto said wave generator; and
wherein said wave generator has a predetermined center of gravity that does not line up with said center of buoyancy, wherein the difference between said center of gravity and said center of buoyancy helps to create an internal moment force within said wave generator that counteracts other moment forces acting on said wave generator.

8. The wave generator of claim 7, wherein said wave generator has a leading edge submerged in said body of water.

9. A wave generator comprising:
a positively buoyant substantially laterally oriented body with flow-forming surfaces thereon, wherein said wave generator is adapted to be pulled substantially through a body of water, said wave generator having a predetermined center of buoyancy; and
a connecting member extended substantially below said center of buoyancy, wherein by pulling said wave generator via a cable secured to said connecting member, a negative moment about said center of buoyancy is created which generates an upward force on a front end of said wave generator, which helps to counteract a downward force created by a positive moment on said front end as said wave generator is pulled through said body of water and lifts water onto said wave generator; and
wherein a stepped section is located beneath an underside surface of said wave generator on substantially an aft section of said wave generator, said stepped section having a forward sloped section that helps to provide a lifting force against said aft section as said wave generator is pulled through said body of water.

10. The wave generator of claim 9, wherein said wave generator has a leading edge submerged in said body of water.

11. A wave generator comprising:
a positively buoyant substantially laterally oriented body with flow-forming surfaces thereon, wherein said wave generator is adapted to be pulled substantially through a body of water, said wave generator having a predetermined center of buoyancy; and
a connecting member extended substantially below said center of buoyancy, wherein by pulling said wave generator via a cable secured to said connecting member, a negative moment about said center of buoyancy is created which generates an upward force on a front end of said wave generator, which helps to counteract a downward force created by a positive moment on said front end as said wave generator is pulled through said body of water and lifts water onto said wave generator; and
wherein said wave generator has at least one ballast tank capable of being filled with water or other material that helps to distribute weight within said wave generator, wherein the location and weight of said at least one ballast tank can help to adjust the location of the wave generator's center of gravity.

12. The wave generator of claim 11, wherein said wave generator has a leading edge submerged in said body of water.

13. A method of keeping a wave generator travelling through a body of water in substantial equilibrium, comprising:
pulling said wave generator with a cable using a connecting member adapted to be extended in a substantially fixed manner relative to said wave generator, wherein said cable is secured to said connecting member at a point that is below a center of buoyancy of said wave generator;
creating a downward force on a front end of said wave generator by causing a leading edge of said wave generator to travel through said body of water and lifting water onto said wave generator, wherein a positive moment is created about said center of buoyancy;
creating a negative moment about said center of buoyancy by pulling said wave generator through said body of water with said cable attached to said connecting member, wherein said negative moment creates an upward force that helps to counteract the downward force created by the positive moment forces acting on said wave generator; and
wherein said method comprises adjusting the center of gravity of said wave generator by using at least one ballast tank capable of being filled with water or other material to help distribute weight within said wave generator.

14. The method of claim 13, wherein said wave generator comprises a positively buoyant and substantially laterally oriented body with flow-forming surfaces thereon, wherein said method comprises lifting water up onto said wave generator with said leading edge, and forming a sheet flow of water across or over said flow-forming surfaces, wherein said flow-forming surfaces have curvatures thereon to help create curling wave shapes thereon.

15. The method of claim 13, wherein said method comprises pulling said wave generator such that said leading edge is submerged within said body of water, and wherein the counteracting forces created by pulling said wave generator through said body of water help to keep the depth of said leading edge substantially constant within said body of water.

16. The method of claim 13, wherein said method comprises stabilizing said wave generator in said body of water by providing a U-shaped edge profile on an aft section of said wave generator, wherein said U-shaped edge profile helps maintain said wave generator in substantial equilibrium in said body of water.

17. A method of keeping a wave generator travelling through a body of water in substantial equilibrium, comprising:
pulling said wave generator with a cable using a connecting member adapted to be extended in a substantially fixed manner relative to said wave generator, wherein said cable is secured to said connecting member at a point that is below a center of buoyancy of said wave generator;
creating a downward force on a front end of said wave generator by causing a leading edge of said wave generator to travel through said body of water and lifting water onto said wave generator, wherein a positive moment is created about said center of buoyancy;
creating a negative moment about said center of buoyancy by pulling said wave generator through said body of water with said cable attached to said connecting member, wherein said negative moment creates an upward force that helps to counteract the downward force created by the positive moment forces acting on said wave generator; and
wherein said method comprises adjusting the center of buoyancy and center of gravity of said wave generator such that they do not line up, wherein the difference between them helps to create an internal moment force within said wave generator, which can counteract other forces acting on said wave generator.

18. A method of keeping a wave generator travelling through a body of water in substantial equilibrium, comprising:
pulling said wave generator with a cable using a connecting member adapted to be extended in a substantially fixed manner relative to said wave generator, wherein said cable is secured to said connecting member at a point that is below a center of buoyancy of said wave generator;
creating a downward force on a front end of said wave generator by causing a leading edge of said wave generator to travel through said body of water and lifting water onto said wave generator, wherein a positive moment is created about said center of buoyancy;
creating a negative moment about said center of buoyancy by pulling said wave generator through said body of water with said cable attached to said connecting member, wherein said negative moment creates an upward force that helps to counteract the downward force created by the positive moment forces acting on said wave generator; and
wherein said connecting member comprises a pivoting rod with a stop wherein said method comprises pulling said wave generator with said cable attached to said connecting member.

19. A method of keeping a wave generator travelling through a body of water in substantial equilibrium, comprising:
pulling said wave generator with a cable using a connecting member adapted to be extended in a substantially fixed manner relative to said wave generator, wherein said cable is secured to said connecting member at a point that is below a center of buoyancy of said wave generator;
creating a downward force on a front end of said wave generator by causing a leading edge of said wave generator to travel through said body of water and lifting water onto said wave generator, wherein a positive moment is created about said center of buoyancy;
creating a negative moment about said center of buoyancy by pulling said wave generator through said body of water with said cable attached to said connecting member, wherein said negative moment creates an upward force that helps to counteract the downward force created by the positive moment forces acting on said wave generator; and
wherein said method comprises extending a lower keel in a fore and aft direction on an underside surface of said wave generator, and stabilizing said wave generator with said keel as said wave generator is being pulled through said body of water.

20. A method of keeping a wave generator travelling through a body of water in substantial equilibrium, comprising:
pulling said wave generator with a cable using a connecting member adapted to be extended in a substantially fixed manner relative to said wave generator, wherein said cable is secured to said connecting member at a point that is below a center of buoyancy of said wave generator;
creating a downward force on a front end of said wave generator by causing a leading edge of said wave generator to travel through said body of water and lifting water onto said wave generator, wherein a positive moment is created about said center of buoyancy;
creating a negative moment about said center of buoyancy by pulling said wave generator through said body of water with said cable attached to said connecting member, wherein said negative moment creates an upward force that helps to counteract the downward force created by the positive moment forces acting on said wave generator; and
wherein said method comprises providing a sloped surface on an underside of said wave generator, and providing a lifting force against an aft section of said wave generator as said wave generator is pulled through said body of water, wherein said lifting force is used to counter other forces acting on said wave generator.

* * * * *